(12) United States Patent
Delorenzis et al.

(10) Patent No.: US 6,305,673 B1
(45) Date of Patent: Oct. 23, 2001

(54) VIBRATION CONTROL SYSTEM

(75) Inventors: Damon Delorenzis, Long Beach; Richard J. Meyer, Santa Fe Springs, both of CA (US)

(73) Assignee: Liquidspring Technologies, Inc., Santa Fe Springs, CA (US)

(*) Notice: Subject to any disclaimer, the term of this patent is extended or adjusted under 35 U.S.C. 154(b) by 0 days.

(21) Appl. No.: 09/606,966

(22) Filed: Jun. 29, 2000

Related U.S. Application Data

(60) Division of application No. 08/895,637, filed on Jul. 17, 1997, which is a continuation-in-part of application No. 08/280,619, filed on Jul. 26, 1994, now abandoned.

(51) Int. Cl.[7] ............................................. F16F 9/10
(52) U.S. Cl. ........................... 267/64.13; 267/64.28; 188/284
(58) Field of Search .................... 188/284, 322.14, 188/322.15; 267/64.13, 64.14, 64.15, 64.16, 64.28

(56) References Cited

U.S. PATENT DOCUMENTS

| | | | |
|---|---|---|---|
| 2,072,701 | 3/1937 | Barlow | 215/32 |
| 2,225,986 | 12/1940 | Glezen | 188/88 |
| 3,146,862 | 9/1964 | Winsen | 188/88 |
| 3,483,952 | 12/1969 | Cardwell | 188/96 |
| 3,618,928 | 11/1971 | Taylor | 267/65 |
| 3,933,344 | 1/1976 | Taylor | 267/64 A |
| 4,031,978 | 6/1977 | Taylor | 180/91 |
| 4,079,923 | 3/1978 | Kirchner | 267/65 D |
| 4,099,602 | 7/1978 | Kourbetsos | 188/300 |
| 4,182,529 | 1/1980 | Taylor | 293/132 |
| 4,212,087 | 7/1980 | Mortensen | 3/1.2 |
| 4,305,486 | 12/1981 | Cowan | 188/319 |
| 4,402,527 | 9/1983 | Kakehi et al. | 280/707 |
| 4,513,833 | 4/1985 | Sheldon | 180/9.1 |
| 4,546,960 | 10/1985 | Abrams et al. | 267/136 |
| 4,561,641 | 12/1985 | DeYoung et al. | 267/64.13 |
| 4,638,670 * | 1/1987 | Moser | 188/284 |
| 4,638,895 | 1/1987 | Taylor et al. | 188/280 |
| 4,671,392 | 6/1987 | Wössner | 188/299 |
| 4,729,459 | 3/1988 | Inagaki et al. | 188/299 |
| 4,733,883 | 3/1988 | Sugasawa et al. | 280/707 |
| 4,741,516 | 5/1988 | Davis | 267/64.13 |
| 4,793,451 | 12/1988 | Taylor | 188/316 |
| 4,826,205 | 5/1989 | Kouda et al. | 280/703 |
| 5,004,264 | 4/1991 | Kozaki et al. | 280/707 |
| 5,018,756 | 5/1991 | Mitchell | 280/81.6 |
| 5,062,659 | 11/1991 | Edahiro et al. | 280/707 |
| 5,097,419 | 3/1992 | Lizell | 364/424.05 |
| 5,152,547 | 10/1992 | Davis | 280/707 |
| 5,265,704 | 11/1993 | Landesfeind | 188/378 |
| 5,297,653 | 3/1994 | Wurtz et al. | 182/63 |
| 5,316,272 | 5/1994 | Davis | 267/64.13 |

FOREIGN PATENT DOCUMENTS

| | | |
|---|---|---|
| 3608738 | 9/1987 | (DE) . |
| Nr 144808 | 10/1903 | (DK) . |
| 0933524 | 4/1948 | (FR) . |
| 2192967 | 1/1988 | (GB) . |
| 2227981 | 8/1991 | (GB) . |
| 57-160707 | 10/1982 | (JP) . |
| 60-179315 | 9/1985 | (JP) . |
| 60-226311 | 11/1985 | (JP) . |

* cited by examiner

Primary Examiner—Matthew C. Graham
(74) Attorney, Agent, or Firm—Christie, Parker & Hale, LLP

(57) ABSTRACT

A vibration control system utilizes a liquid spring filled with a compressible liquid. In its most general embodiment, the vibration control system minimizes the transmission of vibration between a first mass and a second mass, i.e. vehicle frame/vehicle cabin, structure/ground, machinery/platform. The liquid spring can be either a passive or an active system. An active system utilizes a second volume of compressible fluid. A passive system only uses a single volume of fluid. Further, the liquid spring can provide either spring force or both spring and damping forces. Alternatively, a single volume liquid spring can be utilized in conjunction with a conventional damper.

20 Claims, 14 Drawing Sheets

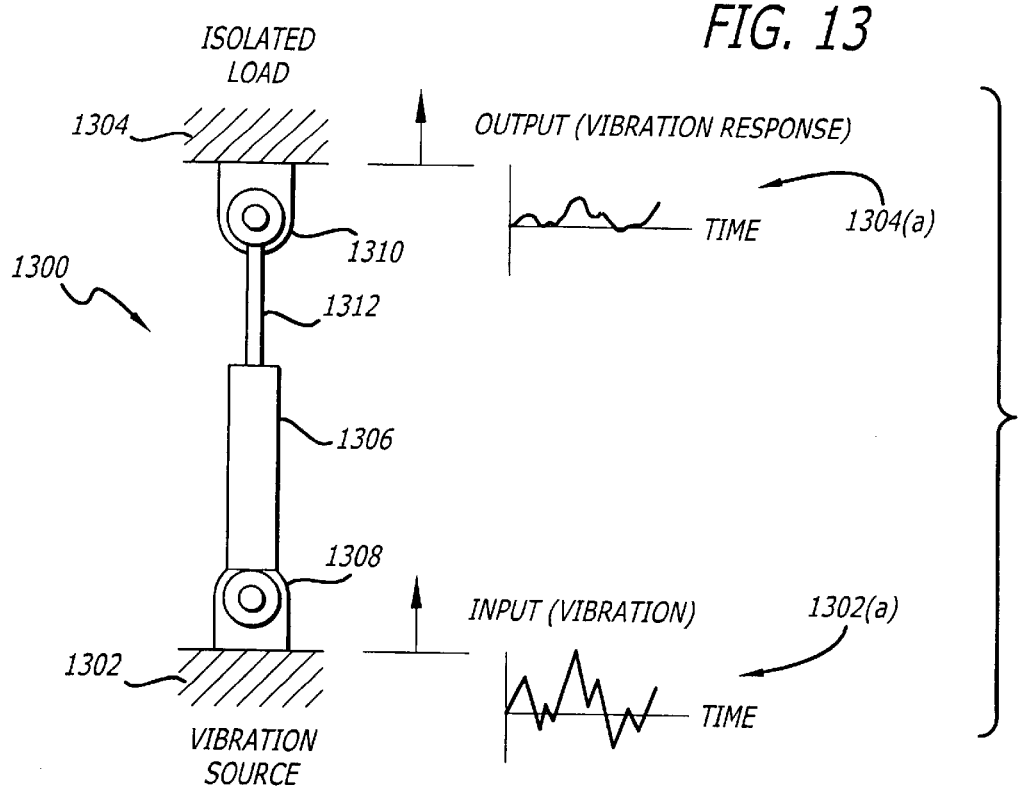
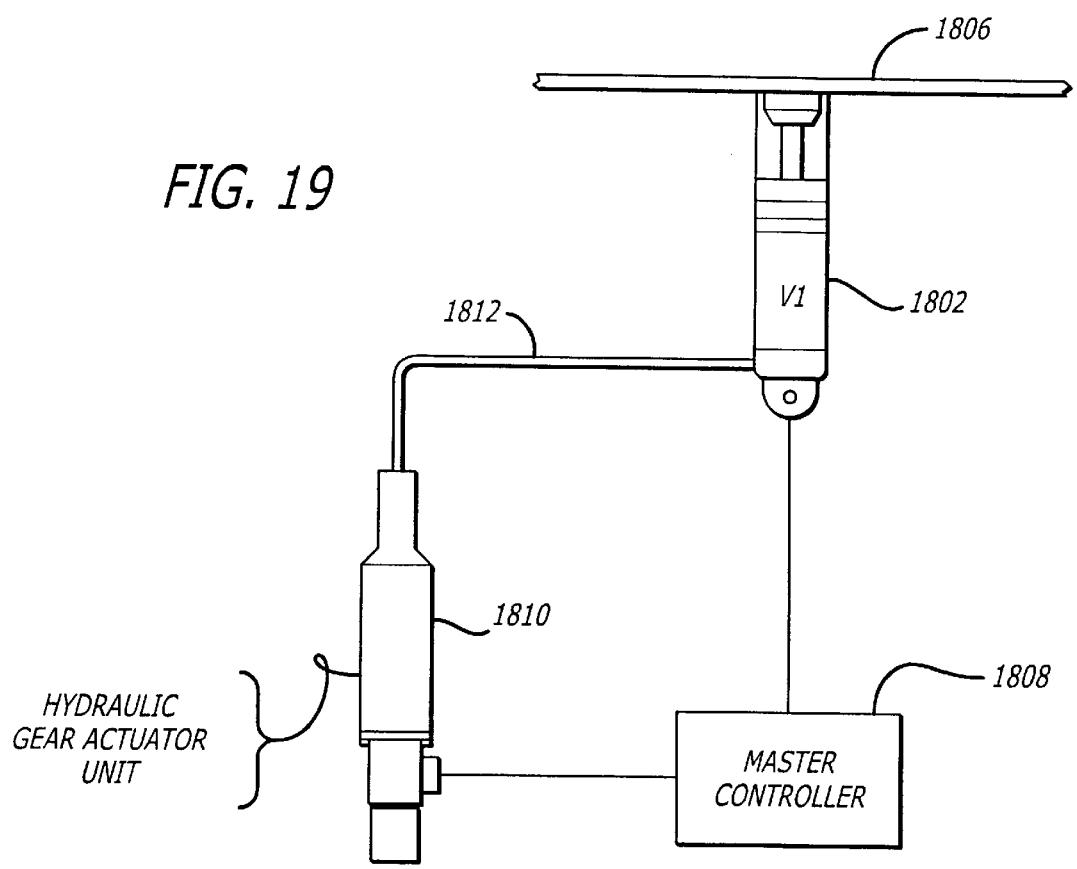

FREQUENCY RESPONSE AT TWO DIFFERENT SYSTEM RATES

TRANSFER FUNCTION GAIN AT TWO DIFFERENT SYSTEM RATES

FIG. 16
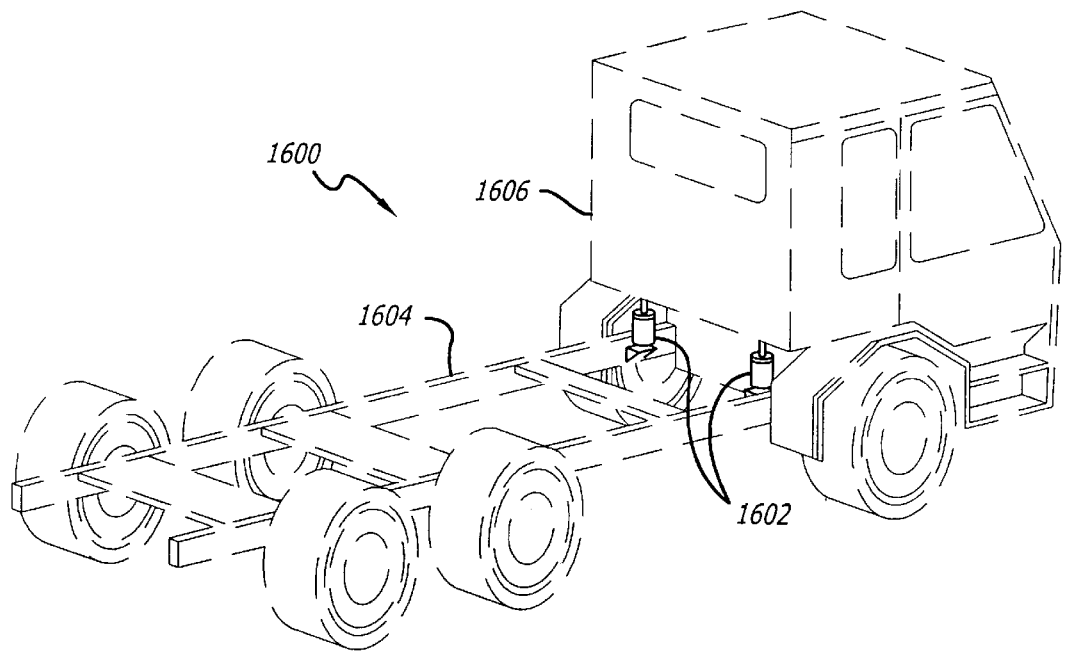
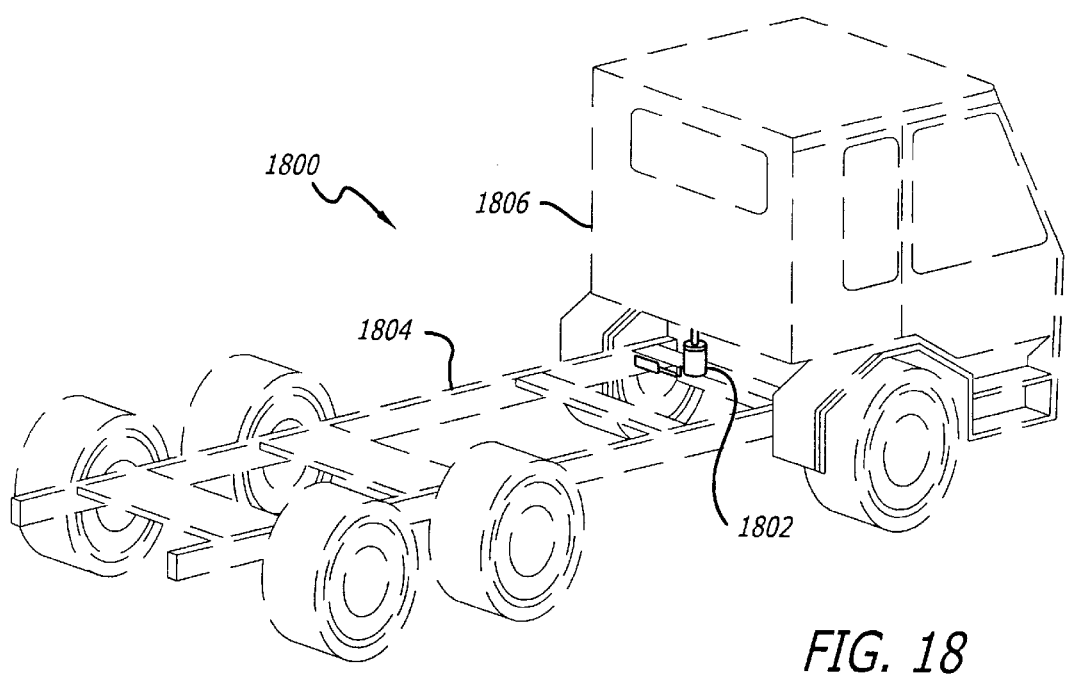
FIG. 18

VIBRATION CONTROL SYSTEM

CROSS-REFERENCE TO RELATED APPLICATION(S)

This patent application is a divisional application of U.S. patent application Ser. No. 08/895,637, filed Jul. 17, 1997, which is a continuation-in-part of pending U.S. application Ser. No. 08/280,619 filed Jul. 26, 1994 ABN and entitled "Liquid Spring Vehicular Suspension System and Associated Control Apparatus" the disclosure of which is hereby incorporated.

TECHNICAL FIELD OF THE INVENTION

The present invention relates generally to a vibration control system and specifically relates to the use of a liquid spring in a variety of environments. The liquid spring can be either an active or passive system. Alternatively, the liquid spring can be coupled to a conventional damping unit.

BACKGROUND OF THE INVENTION

Vibration is a destructive force in a variety of environments. For example, a vehicle experiencing vibration from traveling over a road can damage the structure of the vehicle. Vibration between a vehicle frame and the vehicle cabin can tire a driver. Vibration from an earthquake can topple a structure, such as a building, elevated highway or bridge. Vibration from a air conditioning unit mounted on top of a building can create fatigue and failure of welds within the unit. Vibration at resonant frequency will build upon itself and destroy the unit.

Vibration can be periodic, as created by a rotating compressor in an air conditioning unit or an engine in a car. Periodic vibration is characterized by a particular frequency and amplitude. Random vibration, on the other hand, has no dominant frequency and no dominant amplitude. Instead, the vibration must be analyzed quantitatively to determine average amplitudes and common frequencies. Damping is the process by which vibration steadily diminishes in amplitude. In damping, the energy of the vibrating system is dissipated as friction or heat, or transmitted as sound. The process of damping can take any of several forms, and often more than one form is present.

A liquid spring utilizes a compressible fluid to provide damping forces. A liquid spring can comprise a cylindrical housing having an internal chamber with a compressible liquid therein, a piston reciprocally disposed in the chamber, and a rod structure axially movable into and out of the chamber, secured to the piston, and having an outer longitudinal portion projecting outwardly of one of the housing ends. If a liquid spring is used between a vehicle frame and an associated wheel support structure, the compressible liquid within the liquid spring generates both spring and damping forces in the suspension system in response to relative axial translation between the rod structure and housing of the liquid spring caused by relative vertical displacement between the wheel and the frame. A more detailed description of the general structure and operation of a liquid spring incorporated in a vehicular suspension system may be found in U.S. Pat. No. 4,741,516 entitled "Fluid Suspension Spring and Damper for Vehicle Suspension System" and U.S. Pat. No. 5,316,272 entitled "Liquid Spring Vehicular Suspension System and Associated Control Apparatus," which are incorporated herein by reference.

A need exists for the benefits of a liquid spring in a variety of environments. For example, a need exists for a method of protecting a structure, such as a building, from the destructive vibration from an earthquake. A need also exists for a method of minimizing the vibration transmission between a vehicle's frame and the vehicle's cabin. A need exists for a method of controlling vibration between a stable platform and a piece of machinery which vibrates, such as a motor, fan, compressor, pump, or engine.

SUMMARY OF THE INVENTION

The present invention relates to a vibration control system. The system utilizes a liquid spring filled with a compressible liquid. In its most general embodiment, the vibration control system minimizes the transmission of vibration between a first mass and a second mass. In one environment, the first mass is a vehicle frame and the second mass is a vehicle cabin. In another environment, the vibration is controlled between a building and the ground. In another environment, the vibration is between a piece of machinery which vibrates and a stable platform, such as an air conditioning unit and the top of the building.

The liquid spring can be either a passive or an active system. An active system utilizes a second volume of compressible fluid. A passive system only uses a single volume of fluid. Further, the liquid spring can provide either spring force or both spring and damping forces. Alternatively, a single volume liquid spring can be utilized in conjunction with a conventional damper.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 13 illustrates the general embodiment of the present vibration control system mounted between a first mass and a Second mass;

FIGS. 16 and 17 illustrate an active vibration control system applied between a vehicle cabin and a vehicle frame;

FIGS. 18 and 19 illustrate a passive vibration control system applied between a vehicle cabin and a vehicle frame.

DETAILED DESCRIPTION OF THE DRAWINGS

Figure 1:
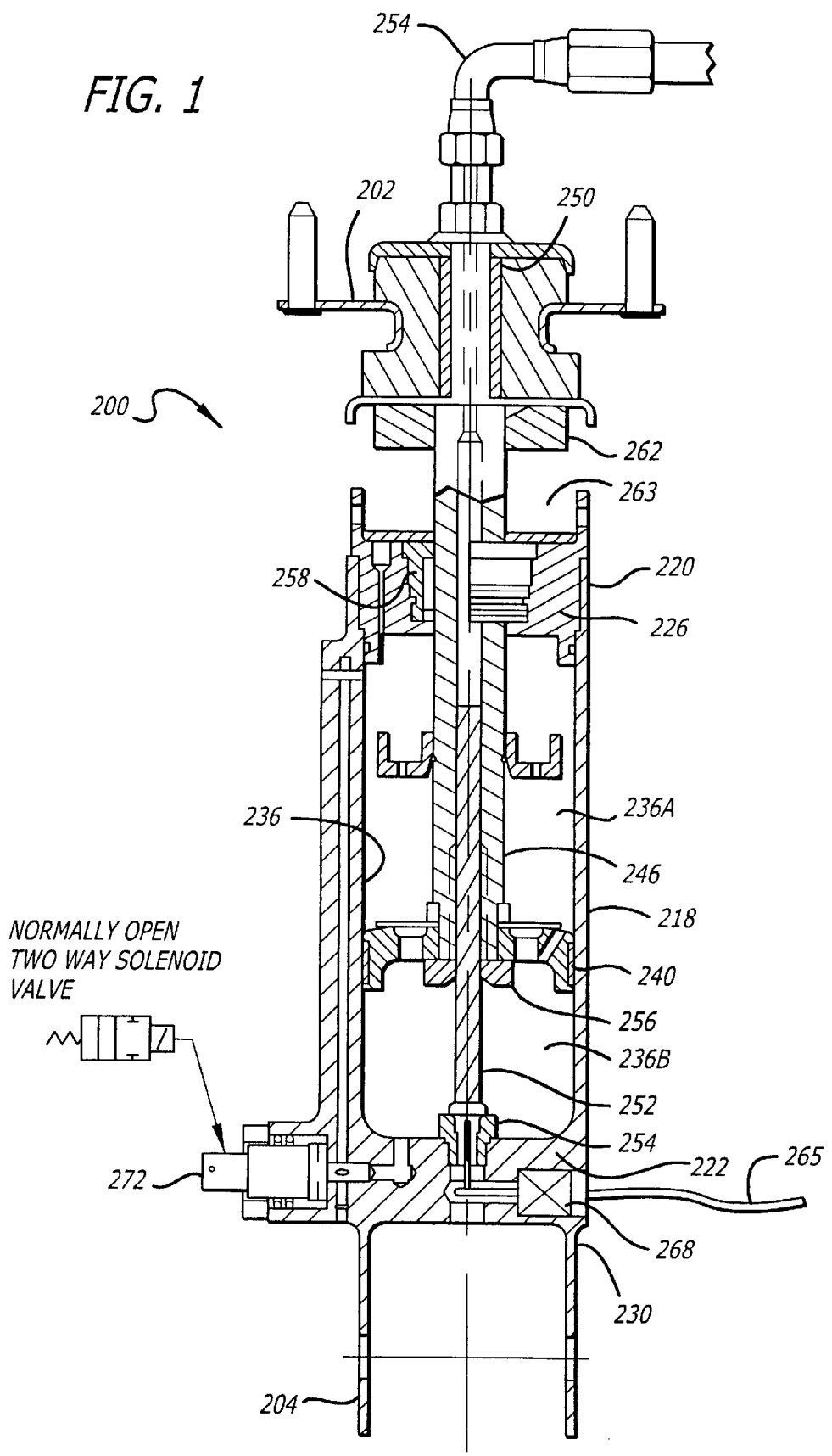
FIG. 1 is a schematic, partially cross-sectional illustration of an adjustable liquid spring device which embodies principles of the present invention.

Schematically illustrated in FIG. 1 is a partially cross-sectional illustration of an adjustable liquid spring device, indicated generally at 200, which embodies principles of the present invention. Liquid spring 200 comprises a generally vertically oriented, single rod end type liquid spring. The present invention also comprehends the use of a double rod end type liquid spring as described in U.S. application Ser. No. 927,795 and incorporated herein by reference. The liquid spring 200 is connected by its upper end mounting bracket 202 to the vehicle frame, (not shown), and by its lower end mounting bracket 204 to the support structure (not shown) of its associated wheel, and operates to provide the requisite suspension system spring and damping forces at its associated wheel location.

Liquid spring 200 includes an elongated, generally vertically oriented tubular housing 218 having an upper end 220 and a lower end 222. An upper annular gland member 226 is threaded into the upper housing end 220 and a lower annular gland member 230 is welded or threaded to the lower housing end 222.

The gland members 226 and 230 define within the housing 218 interior a chamber 236 which contains a compressible liquid. An annular piston 240 is vertically reciprocable within the chamber 236 and divides it into an upper "rebound" chamber 236a, and a lower "jounce" chamber 236b. An elongated hollow cylindrical rod structure 246 is coaxially secured to the annular piston 240 at a lower end and coaxially secured to upper mounting bracket 202 at an upper end. Rod structure 246 has a cylindrical interior chamber 242 extending from its upper end 254 to its lower end 256 and passing through the central opening in annular piston 240. Interior chamber 242 decreases the weight of the rod structure 246, and allows for the incorporation of an integral position sensor as described hereinbelow.

The rod structure 246 is slidably and sealingly carried within a suitable seal structure 258 in upper gland member 226 as known in the art. An upper end portion of rod structure 246 is extended upwardly through resilient jounce bumper 262 which abuts against bounce pad cavity 263 when rod structure 246 is fully extended into the chamber 236.

With the vehicle at rest, the portion of the vehicle weight borne by the wheel structure associated with the liquid spring 200 exerts a downward axial force on the rod structure 246, tending to force it further into the chamber 236. Downward movement of rod structure 246 in this manner progressively decreases the volume of the compressible liquid within the chamber 236 due to the increased space occupied by the progressively extending rod structure 246. This volume decrease, in turn, increases the pressure of the compressible fluid within the chamber 236, which exerts a progressively increasing net upward force on rod structure 246 and piston 240. This force tries to push the rod structure 246 back out of the chamber 236. When this net, upwardly directed fluid pressure force on the rod structure 246 and piston 240 equals the portion of the vehicle weight borne by its associated wheel structure, the piston 240 will be at a vertical equilibrium point within the housing chamber 236—a point which, as a general proposition, establishes the "ride heights" of the vehicle when it is at rest or travelling along essentially level terrain.

When an additional, upwardly directed "jounce" force is imposed upon the wheel structure, the housing 218 is moved further upwardly along the rod structure 246 in a manner further inserting the rod structure 246 into the chamber 236, thereby progressively increasing the compressible liquid pressure and the net upward pressure force on the rod structure 246 and piston 240. When the upward wheel structure force is decreased, for example when the wheel structure travels downwardly through the "rebound" portion of its overall wheel stroke, the internal compressible fluid pressure force within the housing 218 acts to drive the housing downwardly relative to the rod structure 246. In this manner, the rod travel-responsive pressure variations in the compressible fluid provide the liquid spring 200 with the "spring" portion of its overall suspension action. Energy is stored within the compressible liquid during jounce and released from the compressible liquid during rebound.

The "damping" portion of the liquid spring 200's overall suspension action is accomplished in the present invention by permitting compressible liquid bypass flow across or around piston 240 from jounce chamber 236b and into rebound chamber 236a as the housing 218 is deflected upwardly relative to the piston 240, and controllably permitting compressible liquid bypass flow across or around the piston 240 from rebound chamber 236a and into jounce chamber 236b as the housing 218 is deflected downwardly relative to the piston 240. Such damping bypass flow is representatively provided for by means of low speed and medium speed disc deflection and high speed passages. Also, adjustable damping can be accomplished by activating a solenoid that allows low speed (stage 1) flow to be changed under the control of a master controller. Such bypass flow is discussed in greater detail hereinbelow with reference to FIGS. 4 and 5.

A coupling 250 is provided which is in fluid communication with chamber 236. Coupling 250 allows a secondary, external volume (not shown in FIG. 1) of compressible fluid to be selectively placed in fluid communication with the compressible fluid in chamber 236. As described hereinbelow with reference to FIG. 2, this allows the liquid spring 200 to exhibit two different spring rates, depending on whether or not the secondary volume is coupled to the chamber 236 volume. A more complete description of this feature of the present invention is described hereinbelow with reference to FIG. 3.

In a liquid spring vehicular suspension system, it is sometimes desirable to know the relative amount of extension of rod structure 246 into the chamber 236. The liquid spring 200 of FIG. 1 provides an internal position sensor within the liquid spring 200, thereby isolating the position sensor from environmental hazards which have limited the effectiveness of prior art position sensors. A metallic cylindrical rod position sensor 252 is fixedly attached to lower gland member 230 by means of a non-metallic nut 255. An upper end of cylindrical rod 252 extends into the hollow interior of metallic rod structure 246 and therefore will create an electrical capacitance proportional to the amount of extension of the position sensor 252 into the rod structure 246. Because the position sensor 252 is fixed relative to the chamber 236, the portion of cylindrical rod 252 which extends into the interior of rod structure 246 is directly proportional to the amount of extension of rod structure 246 into chamber 236. A nylon spacer (not shown) at the top of position sensor 252 (or other convenient method) is used to isolate position sensor 252 from the rod structure 246. The space between sensor 252 and rod structure 246 is filled with the compressible liquid, which acts as the dielectric material.

The capacitance formed between the sensor 252 and the rod structure 246 can be calculated by the expression:

$$C = 8.5 * ER * [((b/a)+1)/((b/a)-1)]$$

where C is the capacitance in picoFarads/foot, ER is the dielectric constant (relative to air) of the compressible fluid used to fill the liquid spring, and (b/a) is the ratio of the radii of the inside and outside plates of the capacitor (252 and 246, respectively). It can therefore be seen that a linear change in capacitance between members 252 and 246 will occur which is proportional to the amount of extension of rod structure 246 into chamber 236. Since position sensor 252 is electrically isolated from the body of the assembly and coupled to a wire 265 brought outside the liquid spring 200, it is therefore possible to externally measure the relative positions of position sensor 252 and rod structure 246 by measuring the capacitance between them.

If the diameters of the position sensor 252 and rod structure 246 are uniform, the change in capacitance during jounce and rebound will be linear and can thus be used to determine the relative positions of the rod structure 246 and chamber 236. Additionally, by monitoring the rate of change of the capacitance, the direction of movement, velocity and acceleration of the wheel structure may be determined, in addition to its position. Such information can be used by a control system (such as the system of FIG. 3) to change the vehicular suspension settings based on this information.

Figure 2:
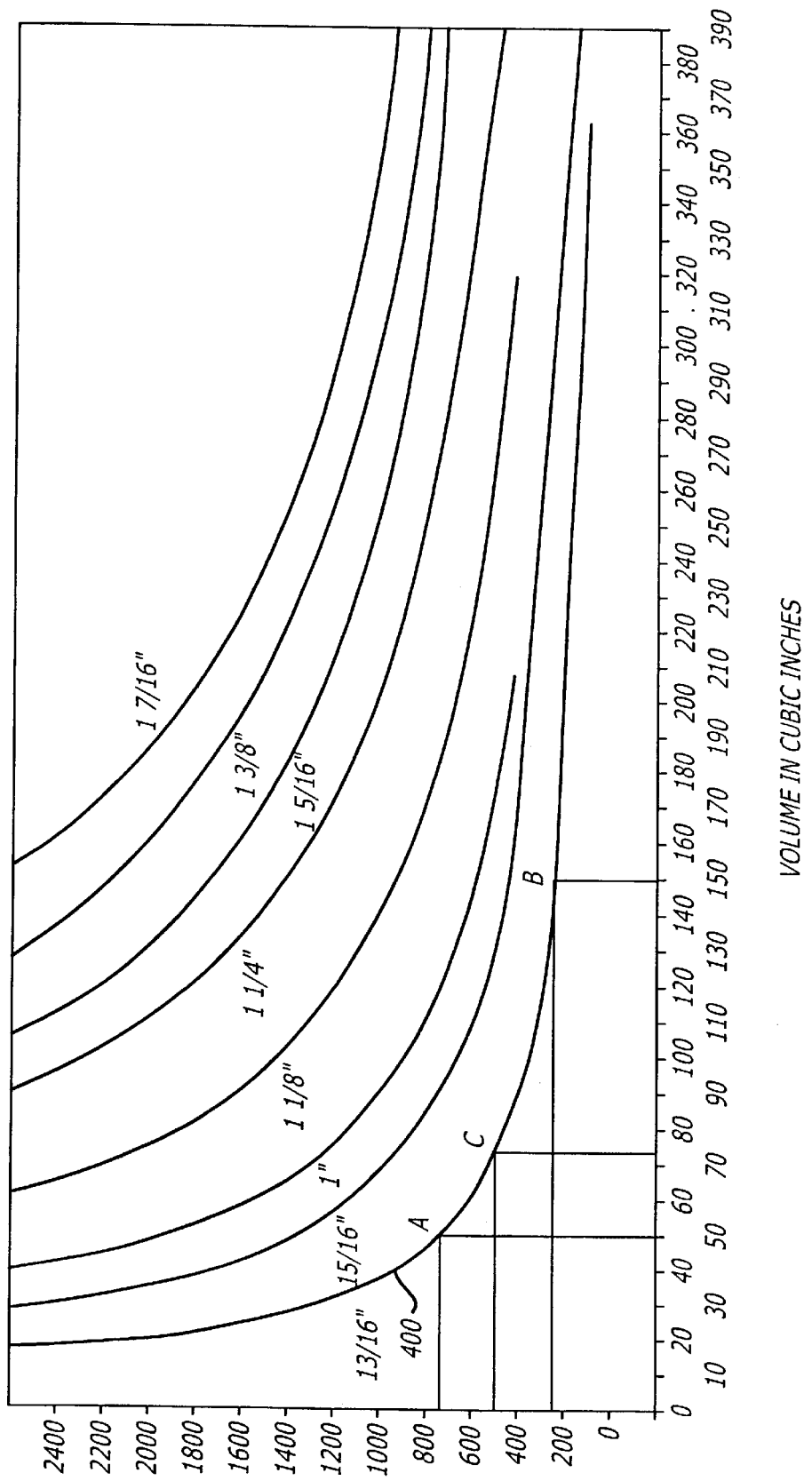
FIG. 2 is a graph showing the spring rate variation versus chamber volume of the liquid spring device of FIG. 1 in which the effect of rod diameter is illustrated parametrically.

Referring now to FIG. 2, there is shown a graph detailing the variation in spring rate versus total chamber volume for the liquid spring device 200 of FIG. 1, and any other volumes connected thereto (as will be explained hereinbelow with reference to FIG. 3). The curves plotted in FIG. 2 are determined by experimental measurement at constant temperature and one inch of rod travel for an array of rod diameters. Consequently, the larger the rod 246 diameter, the greater the spring rate for any given chamber 236 volume. A wide range of spring rates can be set for any given liquid spring device 200 by variation of only the liquid chamber 236 effective volume.

To illustrate this point, assume that the outside diameter of a rod 246 of a liquid spring 200 is 13/16 inches. The spring rate of the liquid spring will therefore lie somewhere on the curve 400, depending on the chamber 236 volume. Assume that the chamber 236 volume is designed to encompass 50 cubic inches. The spring rate would then lie at point A, which indicates that for a rod 246 diameter of 13/16 inches, a chamber 236 volume of 50 inches corresponds to a spring rate of 720 lbs/inch. This spring rate will provide a substantially stiff or firm ride for the vehicle that the liquid spring 200 supports. Such a spring rate provides good vehicle handling, such as during cornering, but many passengers find such stiffness to be uncomfortable when travelling over bumps and other road surface irregularities. Now assume that the chamber 236 volume is instead designed to encompass 150 cubic inches. The spring rate would then lie at point B, which corresponds to a spring rate of 240 lbs/inch. This spring rate will provide a substantially soft or pliant ride for the vehicle which the liquid spring 200 supports. Such a spring rate is adequate for a vehicle travelling in a straight line, as it absorbs the shock of bumps and other road surface irregularities, but it does not provide very good cornering support, allowing the vehicle body to roll excessively during a turn. In the past, designers have been forced to select either a high spring rate (such as point A) or a low spring rate (such as point B) as the suspension setting for the vehicle, which requires a trade-off between passenger comfort and vehicle handling. However, with the liquid spring 200 of the present invention, the spring rate may be alternated between points A and B, as desired, for proper handling of the vehicle as well as the comfort of passengers.

Figure 3:
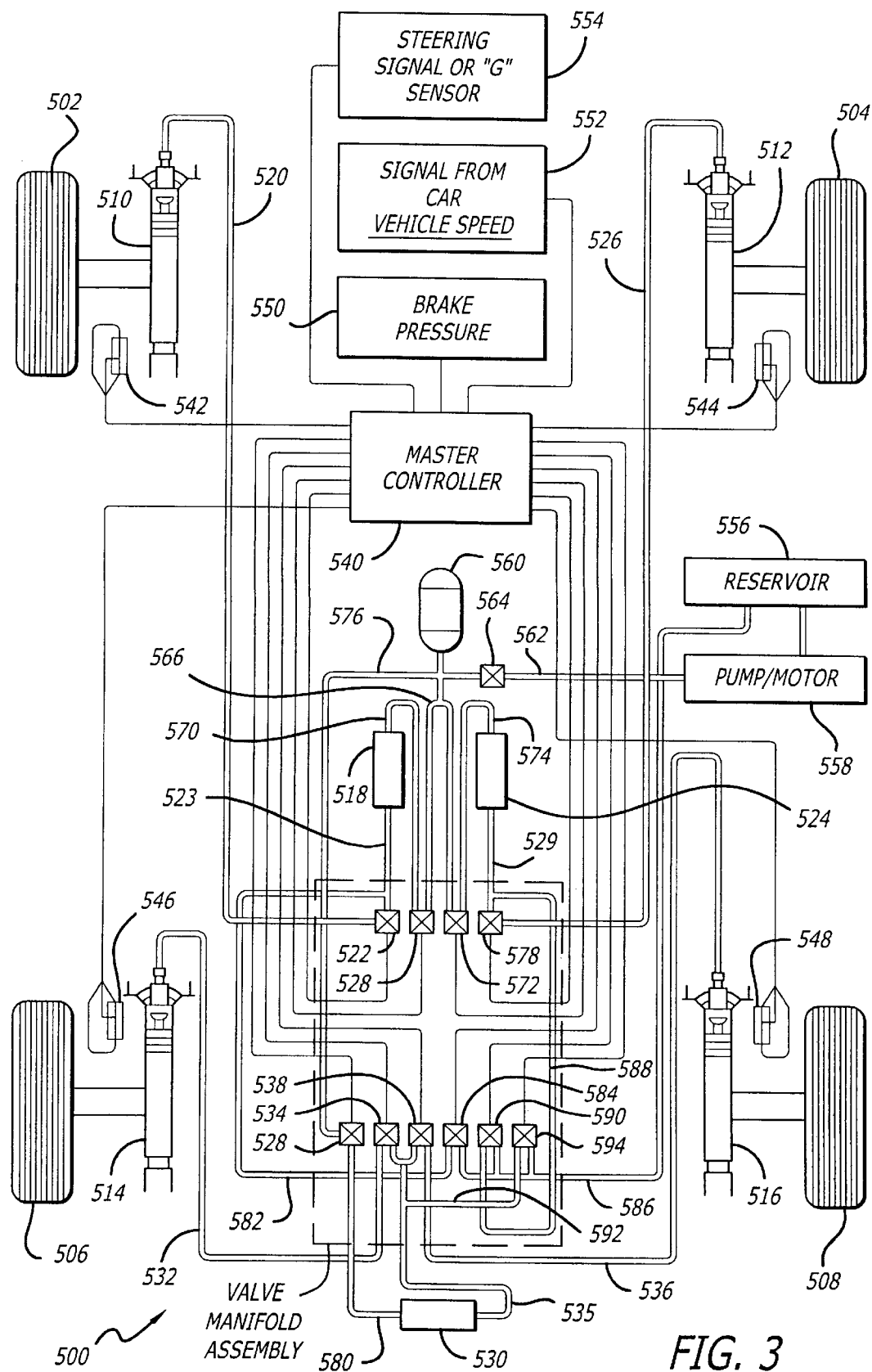
FIG. 3 is a schematic diagram of a liquid spring vehicular suspension system.

The changing of the spring rate is accomplished by use of the liquid spring's ability to couple its chamber 236 volume to a second volume of compressible liquid (see FIG. 3) by the opening of solenoid stabilizer valve (see FIG. 3). The second volume of compressible liquid may be located remotely from liquid spring 200. If the chamber 236 volume is V1 and the second volume is V2, opening the solenoid stabilizer valve coupling V1 and V2 effectively makes the liquid spring chamber volume increase from V1 to (V1+V2), switching the spring rate from point A to point B (assuming V1=50 cubic inches and V2=100 cubic inches). If the solenoid stabilizer valve is closed, isolating V2 from V1, the spring rate immediately returns to point A. Because the change in the spring rate is caused by the flow of a pressure wave and not by any substantial liquid flow between the two volumes, the spring rate of the liquid spring can be changed as rapidly as the solenoid stabilizer valve can be switched.

The choice of spring rates for any particular liquid spring is not limited only to two settings, such as points A and B. The liquid spring chamber 236 volume may be selectively coupled to several external volumes of varying sizes. The spring rate may then be adjusted to a different value for each different external volume. For example, the liquid spring 200 described above, having a chamber 236 volume of 50 cubic inches and a second volume of 100 cubic inches, may be designed so that a third volume V3=25 cubic inches can be coupled to the chamber 236 volume through another solenoid valve. This allows the spring rate to be set at point C, or 500 lbs/inch, when V1 and V3 are coupled. The liquid spring 200 may now be adjusted to any one of three spring rates A, B or C (240, 500 or 720 lbs/inch, respectively) by the appropriate opening or closing of the associated solenoid valves. It is also possible to couple V1, V2 and V3 together simultaneously by opening both solenoid valves at the same time.

Note that it is desirable, but not necessary, to design the liquid spring 200 to have a chamber 236 volume corresponding to the highest desired spring rate. This allows the liquid spring to be constructed using the smallest possible chamber 236 volume (corresponding to the highest desired spring rate), resulting in a liquid spring which is relatively compact and lightweight, while the larger, heavy volumes associated with the lower spring rates may be located remotely via interconnecting lines. The increased compactness of the liquid spring facilitates its mounting in the vehicle, while its reduced weight reduces the unsprung weight of the vehicle. Because it is primarily the pressure wave that communicates between the chamber 236 volume and the external volume(s), there is no disadvantage to remotely locating the external volume(s).

Referring now to FIG. 3, there is illustrated a schematic diagram of a liquid spring vehicular suspension system of the present invention, indicated generally at 500. The vehicle is represented schematically by left front wheel 502, right front wheel 504, left rear wheel 506 and right rear wheel 508. The suspension system includes four liquid springs: left front spring 510, right front spring 512, left rear spring 514 and right rear spring 516. The connection between each spring 510–516 to each wheel 502–508 is represented schematically. In practice, each liquid spring will be coupled between the frame of the vehicle and the respective wheel support structure.

Left front spring 510 is coupled in fluid communication with secondary volume 518 via line 520, solenoid stabilizer valve 522 and line 523. Right front spring 512 is coupled in fluid communication with secondary volume 524 via line 526, solenoid stabilizer valve 528 and line 529. Left rear spring 514 is coupled in fluid communication with secondary volume 530 via line 532, solenoid stabilizer valve 534 and bifurcated line 535. Right rear spring 516 is also coupled in fluid communication with secondary volume 530, but the connection is made via line 536, solenoid stabilizer valve 538 and bifurcated line 535. The secondary volume connection to each liquid spring 510–516 is made via upper end 254 (see FIG. 1).

The vehicular suspension system 500 contains a fluid reservoir 556 for collecting and storing excess fluid in the system. This excess fluid may be utilize by pump/motor 558 to charge accumulator 560 to a predetermined pressure. Fluid is pumped into accumulator 560 via line 562 and check valve 564. Pressurized fluid in accumulator 560 may be supplied to secondary volume 518 through bifurcated line 566, solenoid fill valve 568 and line 570. Pressurized fluid in accumulator 560 may similarly be supplied to secondary volume 524 through bifurcated line 566, solenoid fill valve 572 and line 574. Additionally, pressurized fluid in accumulator 560 may be supplied to secondary volume 530 through line 576, solenoid fill valve 578 and line 580.

Excess fluid may be removed from the secondary volumes 518, 524 and 530 and deposited into reservoir 556. For this purpose, secondary volume 518 is coupled to reservoir 556 via lines 523 and 582, solenoid drain valve 584 and trifurcated line 586. Similarly, secondary volume 524 is coupled to reservoir 556 via lines 529 and 588, solenoid drain valve 590 and trifurcated line 586. Additionally, secondary volume 530 is coupled to reservoir 556 via lines 535 and 592, solenoid drain valve 594 and trifurcated line 586.

Solenoid valves 522, 528, 534, 538, 568, 572, 578, 584, 590 and 594 may be actuated by electrical signals from master controller 540. Master controller 540 is preferably a digital microprocessor, but may also comprise an analog control system.

Master controller 540 receives input signals from left front height sensor 542, right front height sensor 544, left rear height sensor 546 and right rear height sensor 548. Height sensors 542–548 are operable to generate an electrical signal representative of the relative displacement between the vehicle frame and the wheel support assembly, which corresponds to the relative displacement of rod structure 246 into chamber 236. Master controller 540 receives additional input signals from brake pressure sensor 550, which generates an electrical signal indicating that the vehicle braking system has been activated, and vehicle speed sensor 552, which generates VD an electrical signal indicating the speed of the vehicle. Additionally, master controller 540 receives an electrical signal indicative of turning motion of the vehicle from sensor 554. Sensor 554 may be an accelerometer, or "g" sensor, which senses forces lateral to the direction of motion of the vehicle, or, preferably, sensor 554 may indicate when the steering wheel of the vehicle has been turned. The latter sensor method is preferable because it can give information to the master controller prior to any actual lateral movement of the vehicle. The master controller 540 uses the information provided by sensors 542–554 to alter the characteristics of the vehicular suspension system 500 as will be described in detail hereinbelow.

As described hereinabove with reference to FIG. 2, the spring rate of each liquid spring 510–516 may be changed by the opening or closing of solenoid stabilizer valves 522, 528, 534 or 538 to couple or uncouple the secondary volumes 518, 524 or 530 to the respective liquid springs 510–516. For example, suppose that each liquid spring 510–516 is constructed so that it has a chamber 236 volume of 50 cubic inches. Referring to FIG. 2, it is seen that with a rod 246 outside diameter of $13/16$ inches, the spring rate for each liquid spring 510–516 will be 720 lbs/in. This corresponds to point A on the graph of FIG. 2. Assume, for example, that secondary volume 518 contains 100 cubic inches of compressible fluid. If spring 510 is coupled in fluid communication with secondary volume 518 by the opening of solenoid stabilizer valve 522, the spring rate will almost instantaneously change to 240 lbs/in. This corresponds to point B on the graph of FIG. 2. By opening and closing solenoid stabilizer valve 522, the spring rate of left front spring 510 may be alternated between 720 and 240 lbs/in. A similar adjustment of the spring rate of the right front spring 512 may be made by the opening and closing of solenoid stabilizer valve 528.

The liquid spring units 514 and 516 of the rear suspension may similarly be coupled or uncoupled to individual secondary volumes by the use of solenoid stabilizer valves. Alternatively, as shown in FIG. 3, rear liquid springs 514 and 516 may share a single secondary volume 530 which may be coupled to liquid spring 514 by means of solenoid stabilizer valve 534 and to liquid spring 516 by means of solenoid stabilizer valve 538. The use of the single secondary volume 530 allows the three discrete spring rates to be set for the rear liquid springs 514 and 516. For example, assume liquid springs 514 and 516 have chamber 236 volumes of 50 cubic inches each and that secondary volume 530 has a volume of 100 cubic inches. Assuming the solenoid stabilizer valves 534 and 538 remain open, in the situation where only one of the rear wheels is being displaced (left rear wheel 506, for example), the effective volume for the liquid spring 514 will be equal to the combination of the liquid spring 514 chamber 236 volume, the secondary volume 530 and the liquid spring 516 chamber 236 volume, or 200 cubic inches, while the effective volume for the liquid spring 516 is zero. In the situation where both rear wheels are being equally displaced, the liquid springs 514 and 516 equally share the secondary volume 530, resulting in an effective volume for each liquid spring 514 and 516 of 100 cubic inches. Accordingly, the liquid springs 514 and 516 may have effective volumes ranging between zero and 200 cubic inches (assuming solenoid stabilizer valves open), depending upon their relative displacements.

In the situation where both solenoid stabilizer valves 534 and 538 are closed, each liquid spring 514 and 516 has an effective volume of 50 cubic inches. If solenoid stabilizer valve 5341 is open and solenoid stabilizer valve 538 is closed, liquid spring 514 will have an effective volume of 150 cubic inches, while liquid spring 516 will have an effective volume of 50 inches. Because these differing effective volumes translate to differing spring rates (see FIG. 2), the single secondary volume 530 allows great flexibility in the spring rate of the rear liquid springs 514 and 516. Also, the sharing of the secondary volume 530 allows the position sensor 252 data to be shared between sensors 546 and 548 to allow solenoid fill valve 594 to average the ride height process when the vehicle is not on a flat surface (three-point leveling).

Several changes in the suspension characteristics of the vehicle may be made by master controller 540 based on input data supplied to it by sensors 542–554. For example, when a vehicle that is traveling in a straight line turns from that course, the inertia of the vehicle mass, which attempts to maintain the vehicle on the original straight course, creates a moment force which causes the vehicle body to apply more downward force to the side of the vehicle facing away from the direction of the turn (designated as the "outside"). This increased downward force is applied to the liquid springs on the outside of the vehicle, resulting in the familiar "body roll" exhibited by most cars and trucks during turning. It is desirable to eliminate as much of this body roll as possible in order to provide greater vehicle stability during turning maneuvers. Obviously, the "stiffer" the spring rate of the outside of the vehicle, the less body roll the suspension system 500 will allow. However, such a higher spring rate will often prove to be unacceptable during straight ahead cruising due to the inability of the high spring rate setting to smoothly absorb shocks from uneven road surfaces.

The vehicular suspension system 500 of the present invention solves this problem in the following manner. During normal straight ahead cruising, when a soft ride (i.e. low spring rate) is desired, the master controller maintains solenoid stabilizer valves 522, 528, 534 and 538 in the open position, thereby increasing the effective volumes of the fluid chambers of liquid springs 510–516. To continue the above example, this would set each liquid spring to operate at point B of FIG. 2, providing a low spring rate for a soft ride. When the driver of the vehicle turns the steering wheel to begin a turn, sensor 554 sends a signal indicative of this to master controller 540. The sensor 554 may preferably not generate a signal during steering wheel travel within some predefined "dead band" (this is the area of steering wheel travel about its centered position which has very little effect in actually turning the wheels of the vehicle). Upon receiving a signal from sensor 554 that, for example, a left turn is being executed, master controller 540 closes solenoid stabilizer valves 528 and 538, thereby decreasing the effective compressible liquid volumes of liquid springs 512 and 516. This causes the spring rates for liquid springs 512 and 516 to increase to point A of FIG. 2, thereby providing a stiffer suspension setting on the outside of the vehicle and decreasing the amount of body roll.

When the sensor 554 indicates that the steering wheel has returned to its centered position, master controller 540 opens solenoid stabilizer valves 528 and 538, thereby returning the spring rates of liquid springs 510 and 516 to point B of FIG. 2. In a preferred embodiment, master controller 540 will not implement the above-described roll control when the speed of the vehicle is less than 3 miles per hour (mph) or when the vehicle is moving rearward. This is because there is not a large enough inertial moment placed on the vehicle at these times to cause appreciable body roll.

An additional form of roll control may be included for vehicles with large side profile surface areas, such as buses and trucks. Such vehicles are subject to large tipping forces generated by the effect of wind acting upon their large side profile surface areas. An additional sensor (not shown) may be required which will signal the master controller 540 that the vehicle body is tilting about its center of gravity. When this happens, the master controller 540 may close the appropriate solenoid stabilizer valves to increase the spring rate of the liquid springs on the appropriate side of the vehicle, analogously to the sequence described hereinabove. It may additionally be desirable to maintain this anti-tipping control in an active state no matter what speed or direction the vehicle is traveling in, since the forces which induce the tipping are not related to the vehicle's speed.

The roll control of the vehicular suspension system 500 of the present invention described above provides the function traditionally performed by vehicle stabilizer bars, thereby allowing them to be eliminated. This is an important advantage of the present invention because stabilizer bars have several serious drawbacks. First, stabilizer bars counteract the body roll on one side of the vehicle by applying an upward force to inside wheel of the vehicle during a turn. This torsional force undesirably lifts the inside wheel of the vehicle in addition to limiting body roll. The vehicular suspension system 500 of the present invention does not have this undesirable side effect. Additionally, the traditional stabilizer bars connect the vehicle wheel supports to the vehicle frame through hard rubber bushings. This arrangement allows the transmission of a high level of road noise to the passenger compartment of the vehicle. The use of the vehicular suspension system 500 of the present invention eliminates the stabilizer bars and, consequently, the associated noise transmission path. Lastly, stabilizer bars are traditionally constructed of steel. The use of the vehicular suspension system 500 of the present invention eliminates the stabilizer bars and, consequently, their weight.

Two important features of the vehicular suspension system of the present invention are made possible by the inclusion of the pump 558 and the accumulator 560. The first is the maintenance of relatively constant spring rate curves such as those shown in FIG. 2. Those curves assume a constant temperature of the compressible liquid within the liquid spring. However, it is not feasible in a vehicle suspension environment to maintain the liquid spring compressible liquid at a constant temperature. Because the compressible liquid volume is proportional to temperature, changes in liquid temperature may be counteracted by changing the volume of the compressible liquid. Temperature changes are therefore controlled with the reservoir 556, pump/motor 558 and accumulator 560 system. The pump/motor 558 is controlled by the master controller 540, using inputs from the brake pressure sensor 550 and the compressible liquid pressure in the accumulator 560. The accumulator 560 is sized so that it provides the fill supply when a solenoid fill valve is opened, without the use of the pump/motor 558. Pump/motor 558 is used only to charge the accumulator 560 and this is only done while the brake pressure sensor 550 indicates that the vehicle's brakes have been applied. This prevents the pump/motor 558 from drawing energy from the vehicle except when braking. The environmental temperature characteristics of the compressible liquid are mitigated with the use of the solenoid fill valves 568, 572 and 578, and the solenoid drain valves 584, 590 and 594, the pump/motor 558 and the accumulator 560. Pressure variations in the compressible liquid due to temperature result in vehicle ride height variations which are sensed by the ride height sensors 542–548. The master controller 540 opens or closes selected solenoid fill or drain valves in response to inputs from the height sensors 542–548.

A second important advantage provided by the pump 558 and accumulator 560 is the ability of the vehicular suspension system 500 to automatically level the vehicle. Each height sensor 542–548 sends an individual signal to the master controller 540 indicating the height of the respective corners of the vehicle relative to the respective wheel support structures. In a preferred embodiment, each height sensor 542–548 has a null center position. The null center position corresponds to the desired position of the vehicle body. Each height sensor 542–548 is therefore capable of communicating to the master controller 540 whether the vehicle body at the respective corner is above or below the null center position. In the preferred embodiment, the master controller 540 will execute a three point leveling, wherein the two rear wheels are not leveled independently. If, for example, the height sensor 542 indicates that the left front corner of the vehicle is above the null center position, the master controller 540 will open solenoid drain valve 584, thereby releasing compressible fluid from secondary volume 518 into reservoir 556. Leveling only occurs when secondary volumes are coupled to the liquid springs. When height sensor 542 indicates that the left front corner of the vehicle is at null center, the solenoid drain valve 584 is closed. Likewise, if the height sensor 542 indicates that the left front corner of the vehicle is below the null center position, the master controller 540 will open solenoid fill valve 568, thereby adding compressible fluid from accumulator 560 into secondary volume 5113. When height sensor 542 indicates that the left front corner of the vehicle is at null center, the solenoid fill valve 568 is closed. An identical procedure is used for the right front corner of the vehicle. Both rear wheels of the vehicle are leveled together using solenoid drain valve 594 and solenoid fill valve 578. The control signal to the solenoid drain valve 594 and/or solenoid fill valve 578 is provided by the master controller 540 after electrically averaging the outputs of both rear height sensors 546 and 548. With this technique, the attitude of the vehicle is established by the left front height sensor 542 and the right front height sensor 544, and the rear height sensors 546 and 548 provide a compromise height that allows for leveling on a surface that is not flat (i.e. non-planar). It will be appreciated by those skilled in the art that a four point leveling system may be easily implemented in the present invention by the provision of a separate secondary volume, solenoid stabilizer valve, solenoid drain valve and solenoid fill valve for each rear wheel.

In a preferred embodiment of the present invention, there are two constraints on the levelling control procedure described above. The first is that the vehicle must be moving forward. This prevents the vehicle from attempting to level while passengers are entering or exiting the vehicle. This additionally prevents the vehicle from levelling when a door of the vehicle is open, eliminating the possibility of lowering the vehicle to the point where the door makes contact with, for example, a curb. A second constraint on the automatic levelling feature is that the vehicle will not level unless the accumulator 560 pressure is at least 3400 pounds per square inch (psi). This guarantees that the accumulator 560 will have enough pressure to charge the secondary volume when its associated solenoid fill valve is opened.

In a preferred embodiment, the pump 558 is only activated to charge the accumulator 56) while the vehicle's brakes are applied and the speed is over 2 mph. This allows the accumulator to be charged without impacting the fuel economy of the vehicle as measured by the U.S. government's Corporate Average Fuel Economy (CAFE) standards. This very important advantage of the present invention allows the suspension system 500 to be incorporated into a vehicle without impacting CAFE measurements.

In another embodiment of the present invention, the vehicular suspension system 500 is capable of automatically exercising the levelling control while unattended. In this embodiment, the master controller 540 senses when the vehicle's doors have opened and closed, utilizing input from sensors already present on most vehicles. A further condition is that the ignition must be turned off, which is also conveniently sensed by any simple circuit as is known in the art. After a predetermined time period has elapsed since the occurrence of these two conditions, the master controller 540 "wakes up", and analyzes the output from each of the height sensors 542–548. Because of the variation in volume versus temperature inherent in compressible liquids, the compressible liquid in suspension system 500 may have caused the vehicle to sag or otherwise become unleveled since the system 500 last leveled the vehicle. If such is the case, the master controller activates the appropriate fill and drain solenoid valves (as described above) in order to relevel the vehicle. The master controller will "wake up" on predetermined intervals (for example, every 30 minutes) to re-execute this levelling procedure. In this way, the vehicle may be parked for extended periods of time (such as at an airport parking facility), but will be levelled when the owner eventually returns. A limitation on this automatic levelling feature is it will only occur when there is sufficient pressure in the accumulator 560 to charge the system 500. In other words, master controller 540 will not activate pump/motor 558 to achieve this levelling.

Several decisions made by the master controller 540, in one embodiment, are based upon input from the vehicle speed sensor 552. As discussed above, vehicle levelling is activated at all forward speeds. Vehicle roll control is activated at forward speeds from 3 to 80 mph. With forward speeds of over 80 mph, all solenoid stabilizer valves 522, 528, 534 and 538 are closed, thereby maintaining high spring rates at all four wheels. It will be appreciated by those skilled in the art that the above limitations based upon vehicle speed are designed choices, and that the present invention also comprehends other speed limits which are within the scope of the appended claims.

The vehicular suspension system 500 of the present invention is also capable of providing an anti-dive feature during vehicle braking. Upon receipt of a signal from brake pressure sensor 550, the master controller 540 closes solenoid stabilizer valves 522 and 528, thereby increasing the spring rate at both front wheels. This increased spring rate prevents the front of the car from "diving", or tilting forward due to the increased downward force on the front suspension components during braking. Similarly, an "anti-squat" feature may be provided that increases the spring rate of the rear liquid springs during hard acceleration.

Another important advantage of the vehicular suspension system 500 of the present invention is that it provides extremely good noise damping between the vehicle wheels and the passenger compartment compared to prior art suspension systems. This results from the fact that the liquid spring replaces the steel springs and steel stabilizer bars of a conventional suspension. The density of steel makes it a very good sound conductor, and the connection of the wheel support structure and the passenger compartment with these steel members is effective in transmitting road noise generated by the rolling resistance of the tires as well as impacts between the tires and bumps or potholes. In the liquid spring suspension system 500, the wheel support structures are isolated from the passenger compartment by the compressible liquid within each liquid spring. The compressibility of this liquid makes it an extremely inefficient sound and vibration transmitter. The result is that the passenger compartment is very well isolated from most of the road noise generated by the tires.

Still another important advantage of the liquid spring suspension system 500 is that the replacement of conventional struts, shocks, coil springs and stabilizer bars with the relatively compact liquid springs allows for substantially reduced vehicle cowl heights. This gives the vehicle body designer much greater freedom to implement designs which, because of desired coefficient of drag levels or aesthetic reasons, requires a lower front or rear body height.

It can thus be seen that the control system schematically depicted in FIG. 3 may be conveniently utilized to continuously and automatically adjust the spring force characteristics of the liquid springs 510–516 to generally optimize their suspension performance essentially regardless of what combination of road conditions and driver control inputs the operated vehicle encounters at a given instant.

Figure 4:
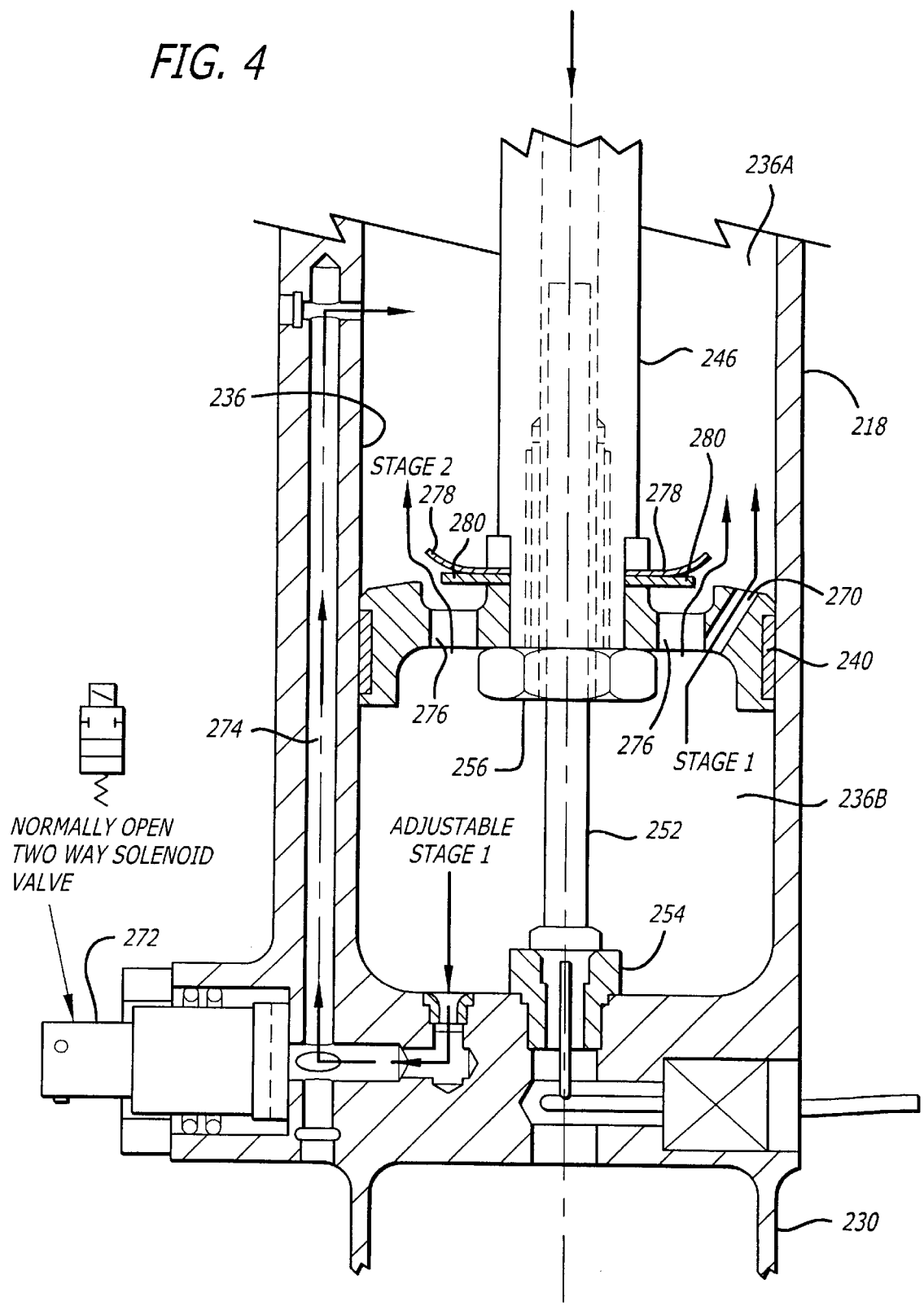
FIG. 4 is a schematic, partially cross-sectional illustration of the device of FIG. 1, showing compressible fluid flow during jounce.

Referring now to FIG. 4, there is illustrated a magnified view of a portion of the liquid spring 200 of FIG. 1, illustrating the operation of the adjustable and non-adjustable damping mechanisms during the jounce portion of wheel structure travel. During jounce, the piston 240 and rod structure 246 move downward relative to the housing 218, thereby decreasing the volume of jounce chamber 236b. Damping of liquid spring 200 is provided by flow of compressible liquid through and/or around piston 240. This compressible liquid flow occurs in two stages, depending upon the magnitude of the jounce force. Stage 1 liquid flow occur; through at least one passage 270 through piston 240 which places the jounce chamber 236b in a fluid communication with the rebound chamber 236a. During any downward movement of the piston 240, compressible liquid will flow through passage 270 from the chamber 236b to the chamber 236a, thereby providing damping of the liquid spring 200. Additional stage 1 liquid flow is provided by means of solenoid flow valve 272 which is operable to variably restrict fluid flow through a passage 274, such restriction being variable from fully open to fully closed. The amount of restriction of the passage 274 imposed by solenoid flow valve 272 is controlled by a signal from master controller 540. At all times when solenoid flow valve 272 is at least partially open during a jounce stroke, stage 1 damping flow will occur in passage 274 coupling chambers 236b and 236a. The ability to vary the amount of flow through passage 274 with solenoid flow valve 272 allows for adjustability of the damping characteristics of the liquid spring 200.

At least one further opening in piston 240 is provided for stage 2 compressible liquid flow. Stage 2 flow occurs at some piston 240 displacement force greater than that necessary for stage 1 flow (it will be appreciated by those skilled in the art that stage 1 flow continues after initiation of stage 2 flow). Passages 276 are covered by dual flexible membranes 278/280 which prevent fluid flow from chamber 236b to chamber 236a during stage 1. Membranes 278/280 cover the opening to passage 276 until some predetermined level of downward piston 240 force is generated which is strong enough to flex the membrane 278, thereby allowing fluid flow from chamber 236b, through passage 276 and into chamber 236a.

Figure 5:
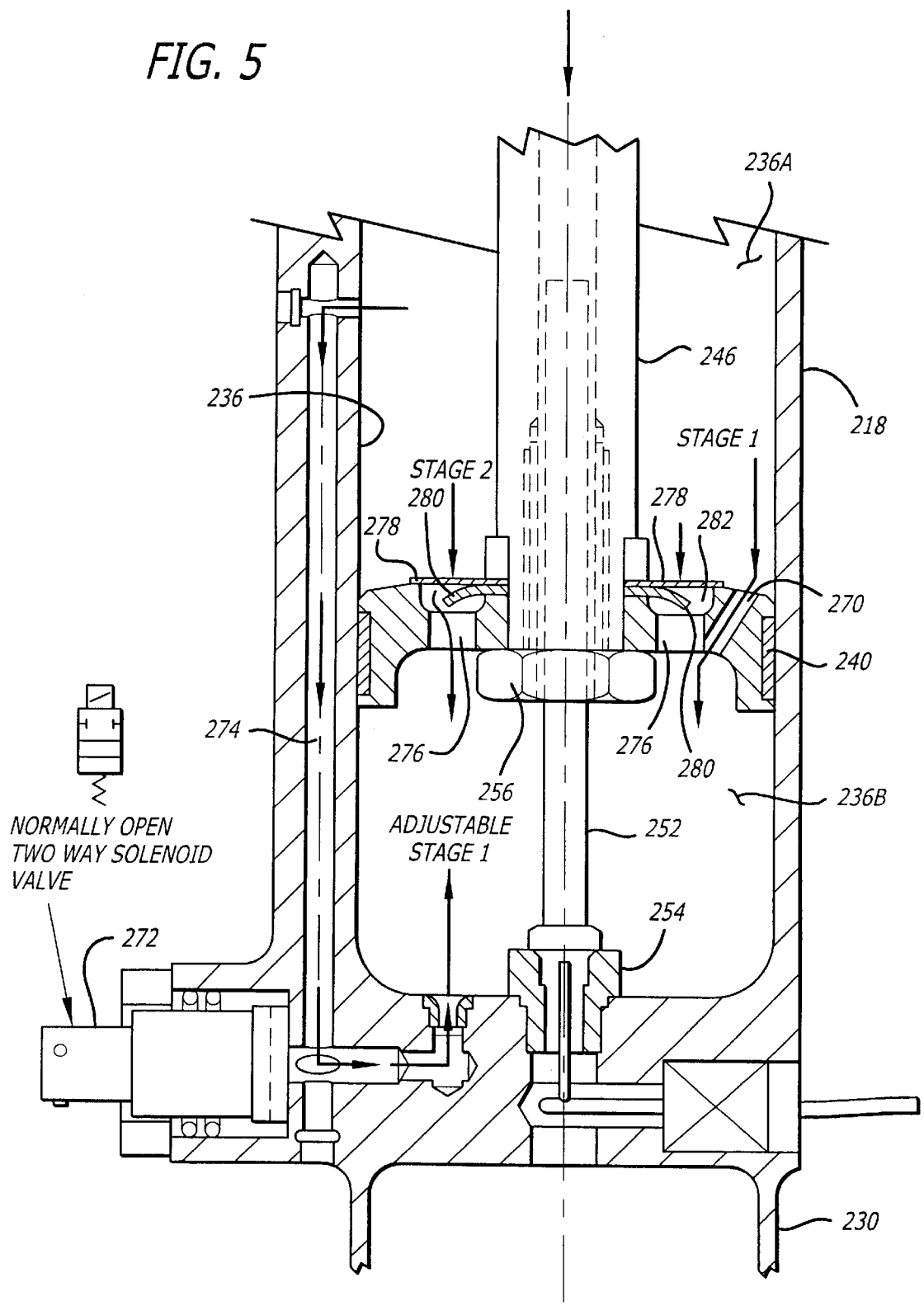
FIG. 5 is a schematic, partially cross-sectional illustration of the device of FIG. 1, showing compressible fluid flow during rebound.

Referring now to FIG. 5, the same portion of liquid spring 200 is illustrated in magnified view, except that the piston 240 is now traveling upward with respect to housing 218 during a rebound stroke. This upward movement of the piston 240 causes increased pressure in the rebound chamber 236a, thereby immediately initiating stage 1 compressible liquid flow through passage 270. Additional stage 1 flow will occur through passage 274, depending upon the flow restriction imposed by solenoid flow valve 272. During stage 1 flow, membranes 278/280 are forced downward, closing off passage 276. Stage 2 flow begins when the upward displacement of piston 240 is great enough to cause membrane 280 to flex downward under the force of compressible fluid flowing through opening 282 in membrane 278. When this occurs, stage 2 flow allows compressible liquid to pass from chamber 236a, through opening 282 and passage. 276 and into chamber 236b. In both the jounce and rebound strokes, the combination of the two-stage fluid flow with the adjustable fluid flow through passage 274, allow for design of nearly linear damping characteristics for the liquid spring 200.

It should be noted that the schematically illustrated suspension system 500 is merely representative and could be modified in a variety of manners if desired. For example, the liquid springs 510–516, while illustrated as a single rod end type, could also be of the double rod end type, and could be interconnected between the vehicle frame and wheel structures in a variety of alternate manners and orientations. The sensing of the housing 218 and rod structure 246 positions could be achieved in a variety of alternate manners, as could the damping bypass flow across piston 240. For example, the position sensor rod 252 may be made of plastic with a vacuum coated metallic covering layer. Further, the volume adjustment mechanisms could be structured and controlled differently, and more than one secondary volume may be used with each liquid spring 510–516. Additionally, the number and type of input signals to master controller 540 could be varied to suit a particular suspension application.

Figure 6:
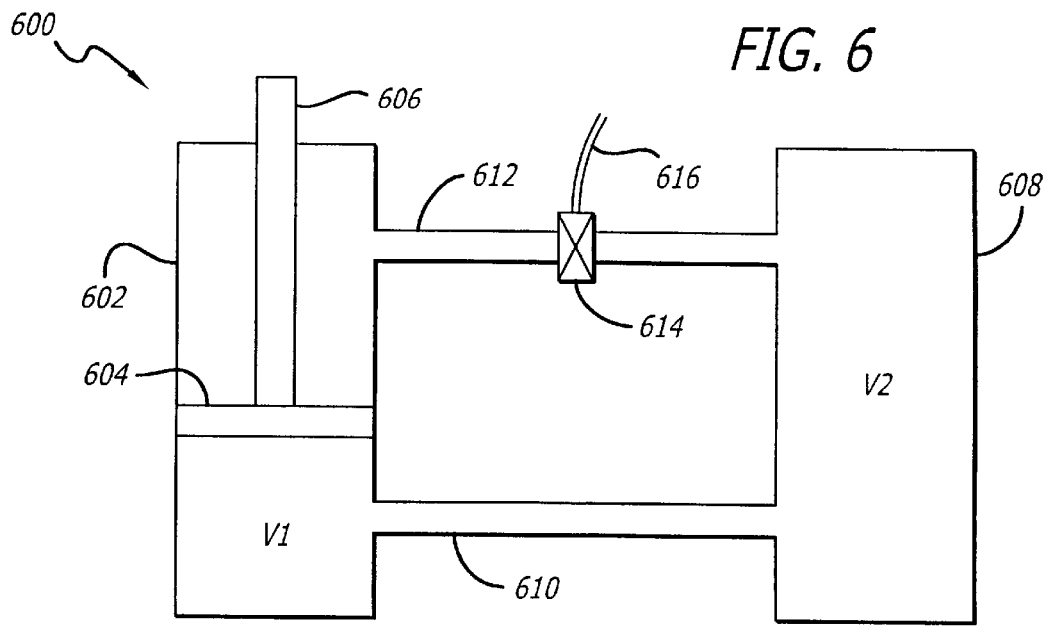
FIG. 6 illustrates an alternative embodiment of the two-volume spring system.

Referring now to FIG. 6, a further embodiment of the present invention is indicated generally at 600. The liquid spring 600 achieves the same variable spring rate effect of the present invention without having "two" volumes in a literal sense. As with the previous embodiments discussed herein, the device 600 has a liquid spring chamber 602 which defines and contains a first volume of compressible fluid V1. The volume V1 is divided into jounce and rebound chambers by a piston 604 coupled to a piston rod 606 for longitudinal translation within the chamber 602. A secondary volume V2 is defined and contained by a second chamber 608. The volumes V1 and V2 are coupled via a fluid passage 610 which is a continuously open orifice. Therefore, in a literal sense, the volumes V1 and V2 are a single volume. However, as will be described hereinbelow, the fluid passage or orifice 610 may be designed so that V1 and V2 behave as separate volumes for the purposes required to provide variable spring rate for the liquid spring 600. The volumes V1 and V2 are further coupled by a second passage or orifice 612. The passage 612 may be selectively opened or closed by a solenoid valve 614 which is controlled by a suspension system controller (not shown) via cable 616. The passage 612 is large enough (or has a low enough fluid resistance) to allow substantially fast pressure equalization between volumes V1 and V2 when the solenoid valve 614 is opened.

The handling characteristics of the vehicle supported by the liquid spring 600 are partially determined by the spring rate of the liquid spring 600. The spring rate is determined by the compressibility of the compressible fluid contained within the volumes V1 and V2. For example, a fluid sold under the trade name Dow Corning 200 Fluid exhibits the compressibility characteristics shown in FIG. 7. Such a fluid has the property that it develops pressure changes according to the percentage compression (cr%) of some defined volume of it, according to the following relationship:

$$\text{relative pressure (psi)} = 93.6*(cr\%)^2 + (732.7*cr\%) - 60.9$$

Figure 7:
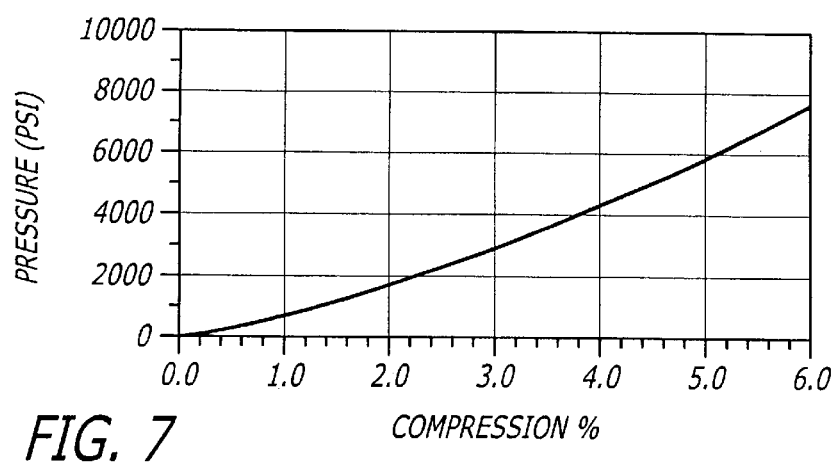
FIG. 7 is a graph illustrating the compressibility characteristics of an exemplary compressible liquid.

During the stroking of the piston 604, the percentage compression moves to the right in the graph of FIG. 7, causing the pressure within the volume V1 to increase. This pressure increase. acts on the rod 606 to create a force increase proportional to rod movement, or in other words, a spring rate. During its operation, the state of the liquid spring 600 is determined by its position on the graph of FIG. 7.

Figure 8:
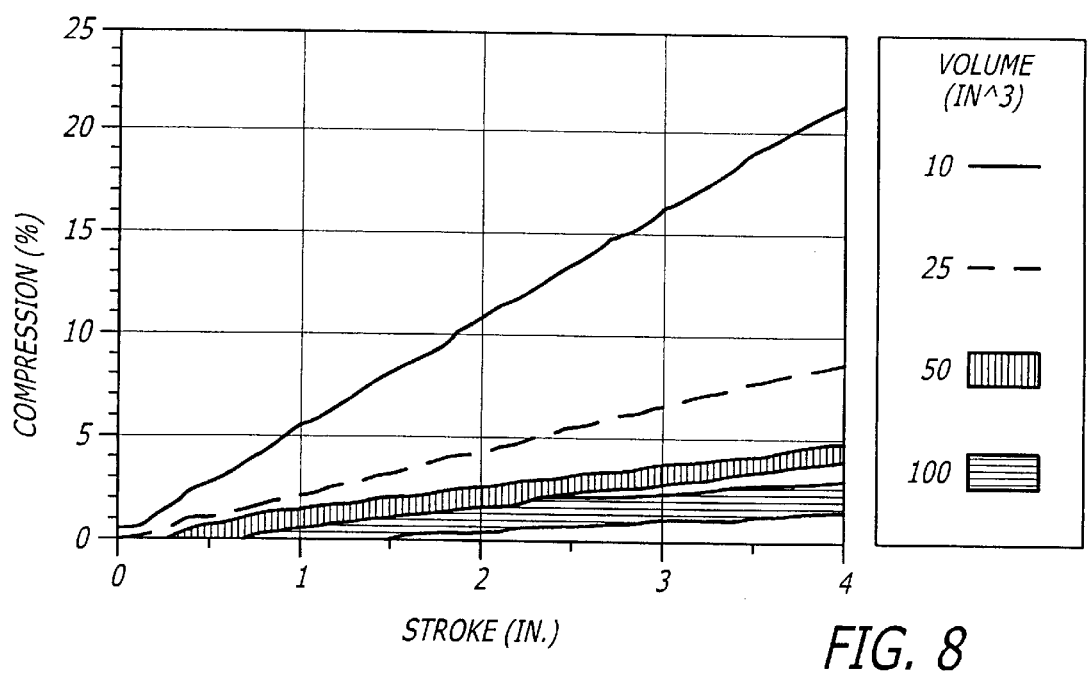
FIG. 8 is a graph illustrating the effect of decreased fluid volume on compression gain.

An important performance characteristic is achieved with the liquid spring 600 by varying the spring rate. In other words, the 'system controller may create a high spring rate or a low sping rate depending upon what is most desirable in light of current conditions. This change in spring rate is accomplished by changing the effective volume of compressible fluid. Reducing the volume of fluid increases the gain of percentage compression to rod 606 movement (stroke,) as illustrated in the graph of FIG. 8. Thus, decreasing the volume increases the percent compression gain, thereby increasing relative pressure gain, which results in more force output from the liquid spring 600 for any given stroke. In other words, decreasing volume increases the spring rate and increasing volume decrees the spring rate.

For a typical liquid spring as shown% in FIG. 6, the operating pressures in the liquid spring 600 would be in the range of 2000 to 3000 psi. For example:

| Rod 606 Diameter: | .75 inch |
|---|---|
| Rod 606 Area: | .44 inches$^2$ |
| Load on Liquid Spring 600: | 1000 lb |
| Pressure in Liquid Spring 600: | 1000 lb/.44 in$^2$ = 2272 psi |

This is for a typical automotive static condition. In the case of the same strut during a turning (roll) maneuver, where the load on the liquid spring 600 would increase with weight transfer during roll, the pressure in the liquid spring 600 would increase to the range of 3000 to 4000 psi. This can be seen as follows:

| Load increase due to weight transfer: | 600 lb |
|---|---|
| Total Load on Liquid Spring 600: | 1600 lb |
| Pressure in Liquid Spring 600: | 1600 lb/.44 in$^2$ = 3636 psi |

In this example, the pressure increase is about 1400 psi. The increase will typically range from 1000 to 2000 psi. During a turning maneuver, we want more roll resistance, hence a grater spring rate. To achieve a greater spring rate, we need to have a smaller volume. Therefore, the controller closes valve 614, effectively isolating V1 from V2, causing the entire pressure :rise of 1400 psi to be experienced within the smaller volume V1. There is thus a press;ure differential of 1400 psi between V1 and V2. In order for the liquid spring 600 to continue to exhibit the increased spring rate due to the smaller effective volume of fluid, this pressure differential between V1 and V2 must be maintained for the duration of the roll maneuver. If the pressure between the two volumes is allowed to equalize because of fluid flow through passage 610, then the effective volume of the liquid spring begins to look like V1+V2, with a resulting drop in spring rate. It will be appreciated by those skilled in the art that the preferred method of maintaining separation of the volumes V1 and V2 is to have complete closure of the fluid paths between the two volumes, as detailed hereinabove for other embodiments of the present invention. However, it is possible to have a continuously open connection between the two volumes and still maintain a pressure differential long enough to exhibit variable spring rates within the liquid spring 600.

In light of the previously discussed examples, it is clear that the valve 614 and constant line 610 between the volumes V1 and V2 should be able to maintain the required pressure differential between the volumes for the period of time it takes to execute the turning maneuver. Once the turning maneuver is complete, the controller will open the valve 614 and equalize ihe pressures quickly. In order to achieve this effect, the constant line 610 must exhibit a high resistance to fluid flow. A simple way to calculate the required resistance of the constant line 610 is to use the Lece Company Liquid Flow Calculation (page M-9, Lee Technical Hydraulic Handbook, 1989, The Lee Company, Westbrook Conn.). This calculation is as follows:

$$L = (20)(V/I)\sqrt{(H/S)}$$

where $L$ = Fluid Flow Resistance (Lohms)

$H$ = Differential Pressure (psi)

$I$ = Fluid Flow Rate (gpm)

$S$ = Specific Gravity of Liquid $V$ = Viscosity Compensation Factor ($p. M$-11)

As a simplifying assumption, the calculation can be made for the required resistance at a constant load and thus a constant differential pressure. This is approximated by a vehicle in a steady constant radius turn. In this case, all flow through the constant line 610 would result in increased stroke. The amount of increased stroke can be calculated using the following relationship:

Rod Velocity (Flow Rate)/(Rod Area)

Rod Velocity (in/sec)=[I/(Rod Area)]*[230/60]

The above two relations are two equations containing two unlnovrn variables (Flow Rate and Resistance). Solving the bottom equation for Flow Rate, substitution of this relationship into the equation and solving for Rod Velocity gives the following relationship:

Rod Velocity (in/sec)=(20)*(231/60)*[V/(Rod Area)(L)]*[√(H/S)]

Figure 9:
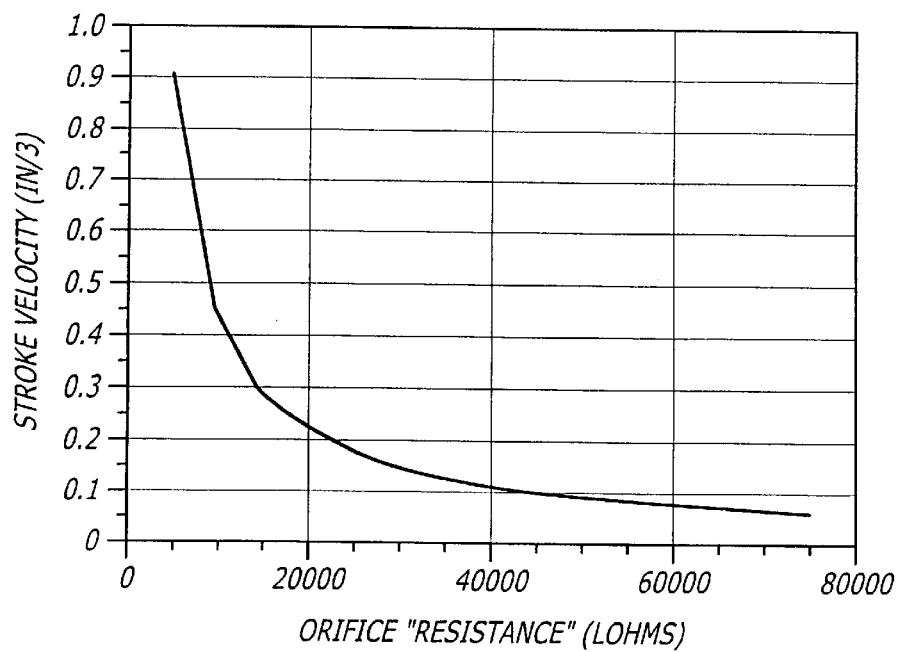
FIG. 9 is another graph which illustrates the relationship between stroke velocity and the orifice resistance.

This equation was used to calculate the data for the graph of FIG. 9, assuming a 21 mm rod diameter. For best handling stability, the rod 606 motion should be kept under 0.25 inches. Assuming a maximum turning time period of 5 seconds, this means that stroke velocity should be no more than 0.05 in/sec. Thus, the constant line 610 of FIG. 6 should have fluid resistance approaching 80,000 Lohms. Such a resistance may easily be accomplished using a small diameter orifice or introducing some sort of swirling or turbulence to the fluid. The Lee Company Catalog contains many such restrictor devices that can provide such performance.

Figure 10:
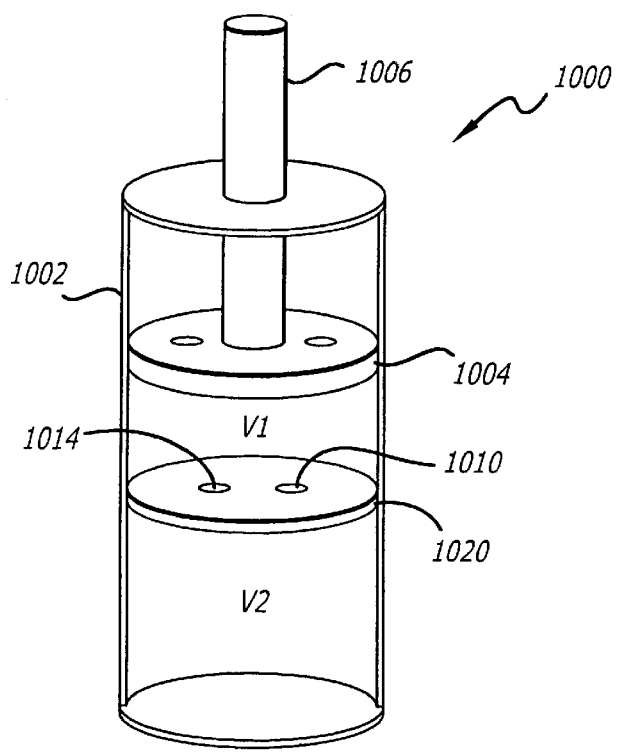
FIG. 10 provides a schematic view of the embodiment shown in FIG. 6.

An alternative arrangement of the embodiment of FIG. 6 is shown schematically in FIG. 10 and indicated generally at 1000. The liquid spring 1000 includes a chamber defuied by cylindrical body 1002. This chamber is divided into two volumes, V1 and V2, by a fixed bulkhead 1020. Tnhe volume V1 is further divided into jounce and rebound chambers by piston 1004, which is coupled to rod 1006. The fixed bulkhead 1020 contains a constant open orifice 1010 as well as a variable valve 1014 which is under the control of a system controller (not shown). The configuration of FIG. 10 is analogous to that of FIG. 6, and the design parameters that apply to the constant line 610 also apply to the constant orifice 1010.

Figure 12:
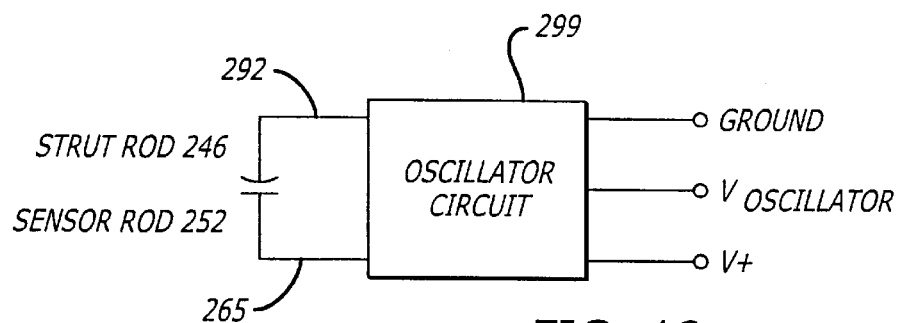
FIG. 12 is a schematic of the position transducer.
Figure 11:
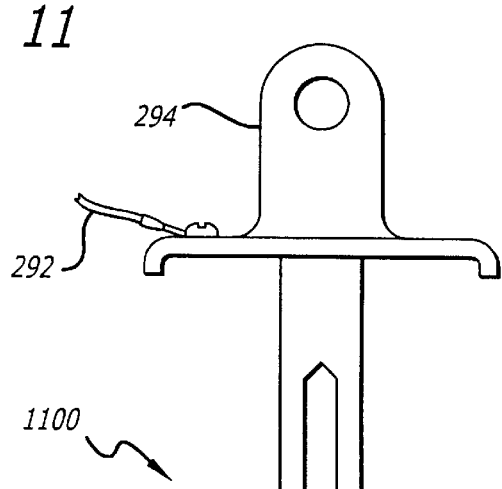
FIG. 11 is a partial sectional view of a position transducer.

As discussed above in reference to FIG. 1, the capacitance between the hollow strut rod 246 and the sensor rod 252 will vary according the amount of extension of the sensor rod 252 into strut rod 246. The measured capacitance can be correlated to the ride height of the vehicle. However, in a much broader sense, a capacitive position transducer 100 can be formed by a hollow rod structure 246 slidably engaged by a sensor rod 252. FIGS. 11 and 12 illustrate such a position transducer, which is suitable for any application including a ride height sensor for an automobile. The sensor rod 252 is separated from the hollow rod 246 by a dielectric, each acting like the opposing plates of a capacitor. The position transducer can be mounted between two surfaces by a first and second mounting bracket 294, 296 which are attached to the rods 252, 246 respectively. The clearance between the rods is maintained by seals 290 which must be made of a nonconductive material. An insulator 298, typically nylon, isolates the rod 246 from the sensor rod 252.

A circuit is formed to measure this capacitance. A ground lead 292 is coupled to the hollow rod 246 while a second lead 265 is coupled to the sensor rod 252. A voltage applied across the rods provides a signal indicative of the amount of rod extension. A oscillator circuit 299 is placed in parallel with the rods. The oscillator circuit has three terminals: a groind ternunal 299a, a $V_{oscillator}$ terminal 299b, and a V+ terminal 299c. The capacitance of the rods governs the output frequency of the oscillator circuit 299, i.e. the frequency of oscillation of the potential across terminals $V_{oscillator}$ 299b and ground 299a.

When the sensor rod 252 extends into the rod structure 246, the capacitance increases, causing a decrease in oscillatory frequency. Conversely, when the sensor rod 252 removes from the rod structure 246, the capacitance decreases, causing an increase in oscillatory frequency. The relative amount of extension of the rod structure 246 into the chamber 236 can therefore be determined as a function of the frequency of the oscillator circuit. In other words, decreasing frequency indicates a jounce condition, and increasing frequency indicates a rebound conditicn. Again, this capacitive position sensor is convenient for use in an automotive suspension for determining the position of a wheel structure, but can serve in any application where there is a requirement for sensing length, linear velocity, or linear acceleration.

Figure 14:
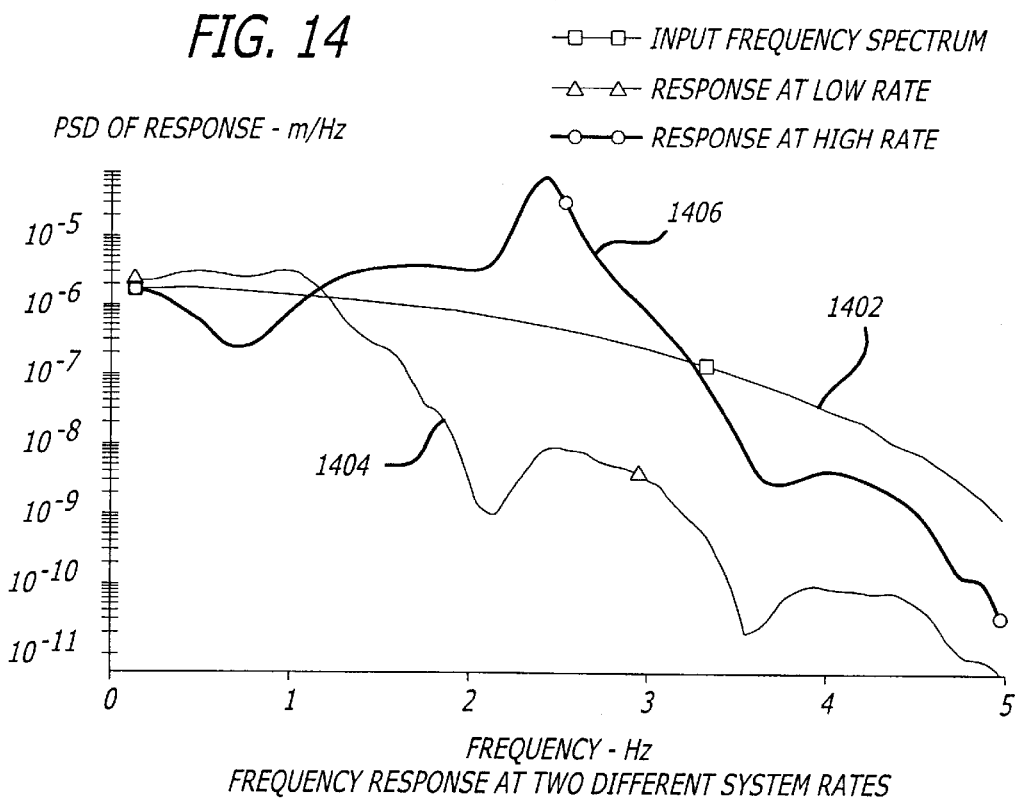
FIGS. 14 and 15 graphically illustrate experimental test data for the vibration control system.
Figure 15:
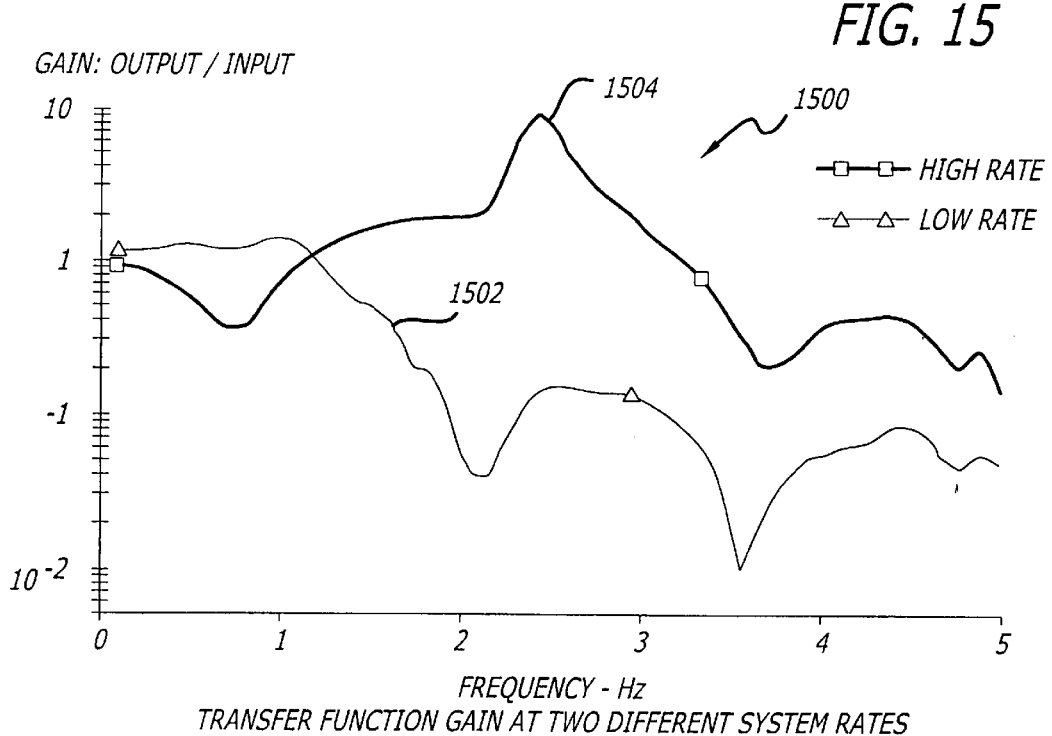

FIGS. 13, 14, and 15 illustrate the general embodiment of the present method of controlling vibration. The method 1300 involves the placement of a liquid spring 1306 between a vibration source 1302 and a load 1304 to be isolated. The method can readily be applied to any suspension of load or a vibration isolation problem. The liquid spring system described above can provide a very wide range of spring rate (several orders greater than air spring technology), coupled with lower energy consumption and cost than active systems, can benefit a variety of non-vehicle-suspension applications. The vibration source can be generally characterized by the graph 1302a which shows a variety of vibration amplitudes as a function of time. The liquid spring can dampen the impact of these vibrations as shown in graph 1304a. Note, the amplitude of the vibration is greatly diminished. This is accomplished by either 1) mechanical isolation of the load from the vibration source, and/or 2) adaptation of the system spring rate according to the characteristics of the vibration input. The liquid spring can be attached between the vibration source and the isolated load by a variety of connections. Pinned connections 1308, 1310 are shown. Pinned connections allow for a certain amount of horizontal translation between the vibration source and the isolated load.

The use of a liquid spring can be a great benefit in a number of applications. For example, earthquakes destroy many types of structures such as buildings, bridges, elevated highways, bridges, and tunnels. In each of these examples, a liquid spring can be placed between a first structural member and a second structural member. An elevated highway, for instance, uses a pad (typically poured concrete) to support a column. A beam then spans between adjacent columns. During an earthquake, vibration creates a dynamic load which overcomes the structural integrity of the column or the beam. A liquid spring can be placed between the pad and the column. Alternatively, the liquid spring can be placed between the column and the beam. If the underlying soil is suitable, a liquid spring could conceivably be placed between ground and the pad. The liquid spring will minimize the transmission of the vibration between the various structural members. A passive system provides a certain level of protection. An active system could actually sense the vibration and determine the best spring rate and damping to reduce any risk of damage. It must be understood that such a system can be used with virtually any type structure. In a building, for example, the liquid spring could be placed between the building foundation and a structural member. Alternatively, the liquid spring could be placed between floors. The liquid spring can be placed at any angle, vertically, or horizontally.

FIG. 14 is illustrative of a typical vibration input/output response characteristics for system with two spring rates. The traces were produced with a math model which describes the suspension of a car going over a bumpy surface. The spring rate for a liquid spring can be controlled by several variables: the cross sectional area of the chamber containing the compressible fluid, the pressure of the compressible fluid, the specific composition of the fluid. A system can be devised which is switchable between a first and a second spring rate. A two-rate system was subjected to an input represented by tracing 1402. The input provided a vibration of various amplitudes over a range of frequencies. The "low rate" response characteristic 1404 is greatly improved over about 1.2 Hz, while being moderately inferior below that frequency. The "high rate" response characteristic 1406 shows an advantage over the "low rate" at frequency values below 1.5 Hz. Thc power spectral density (PSD) of the vibration is measured along the y-axis in $meters^2/Hz$. PSD is a measure of the energy in a motion as a function of the frequency. The graph illustrates the principle that a suspension system benefits from having a low rate and a high rate.

FIG. 15 illustrates a two-rate system response gain 1500. Gain is defined as the output/input. Again the "low rate" response characteristic 1502 is greatly improved at frequencies greater than 1.2 Hz. Since the input frequency characteristic cannot always be predicted or limited to a narrow range, the ability to tune the system response dynamically by changing the spring rate allows the system gain to be reduced. For instance, for inputs below 1.2 Hz, the "high rate" setting 1504 can be chosen to reduce the output response, while for higher frequency inputs the "low rate" setting can be employed. The adjustment is made by connecting the second volume with the first volume in response to a sensors determination of the vibration frequency.

Figure 17:
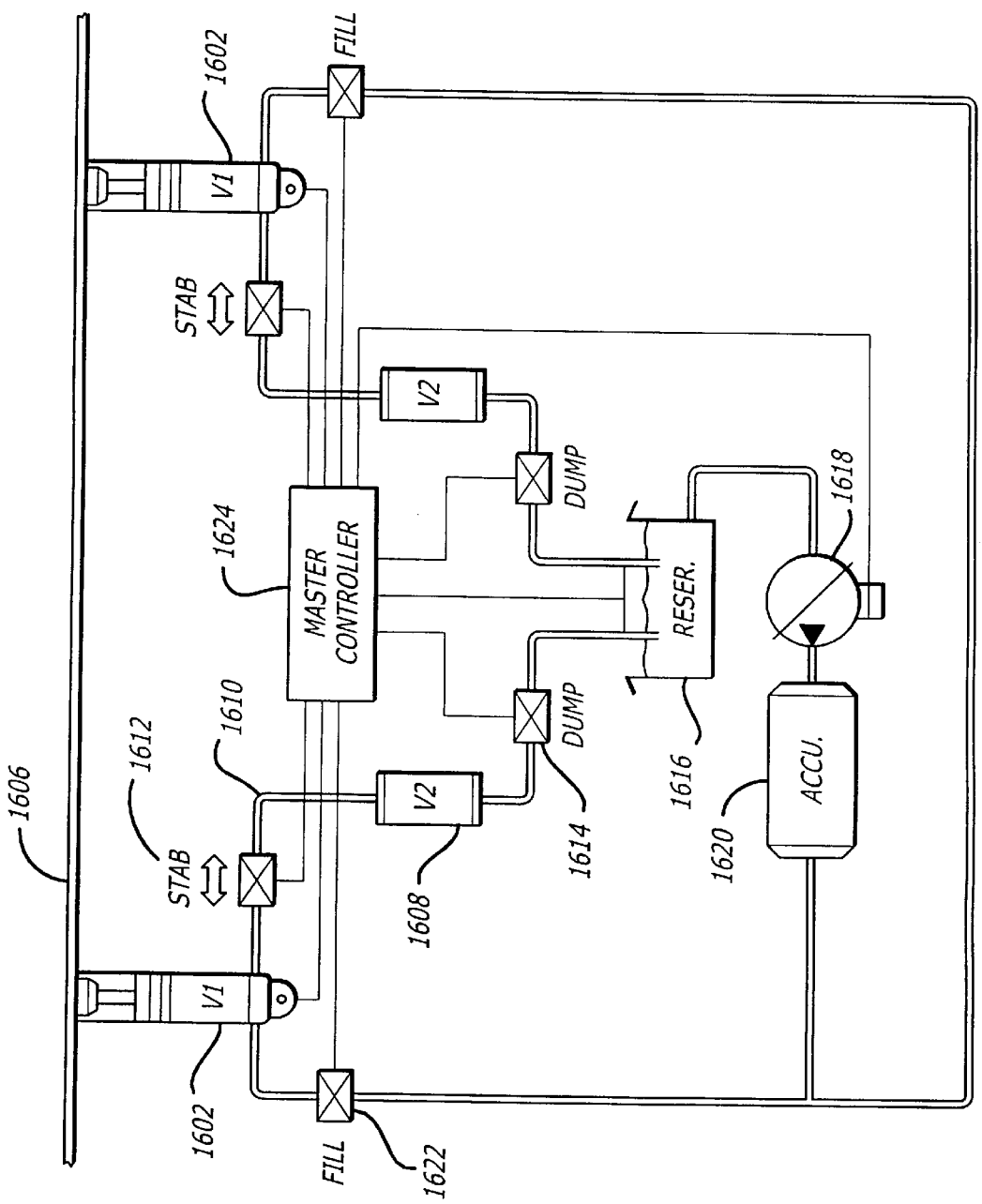

FIGS. 16 and 17 illustrates an active vibration control system applied between a vehicle cabin and a vehicle frame. The system can readily be applied to any suspension of load or a vibration isolation problem. The approach shown is an adaptive twovolume system 1600. This system provides anti-roll control to reduce cab roll during truck comering. A pair of liquid springs 1602 is coupled between the truck frame 1604 and the vehicle cab 1606. The liquid springs also provide anti-squat control to reduce cab squat during truck acceleration. The liquid spring can be used to produce a soft "highway" ride setting to reduce driver fatigue on the highway. It can also be adjusted to provide a stiff "yard" ride setting to reduce cab whip and jerk in the truck yard. Likewise, the spring can provide anti-bounce control during "frame wracidng" to reduce cab bounce during frame twisting under load at low speeds.

FIG. 17 shows the cab mount system 1600 in greater detail. A pair of liquid springs 1602 are mounted between the cab 1604 and the frame (not shown). A supplemental volume 1608 is coupled to each liquid spring by a valved line 1610. A set of valves 1612 are interposed in line 1610 for anti-roll (stabizer) function. A second set of valves 1614 are provided between the second volumes 1608 and a reservoir 1616. Valves 1614 allow for fluid fill and fluid dump functions to the second volumes. The ability to dump compressible liquid provides cab leveling functions and allows for compensation of changes in liquid pressure due to temperature variations.

A hydraulic power supply can comprise a pump 1618, an accumulator 1620, and the fluid reservoir 1616. The hydraulic power supply provides hydraulic power for cab leveling. The flow is controlled by a fill valve 1622. A controller 1624 processes information from sensor inputs, to create output control signals for the various valves and the hydraulic pump. As described above, the liquid springs 1602 can be controlled to change spring rate, damping (not shown here) and leveling control by opening or closing valves in response to inputs as deternnined by some controller system. If the system is used to control vibration in a building, the building's own water supply could act as the power supply. Any suitable power supply can be used.

FIGS. 18 and 19 illustrate a passive vibration control system applied between a vehicle cabin and a vehicle frame. This minimalie system provides the improved damping and vibration isolation of the basic liquid spring with the temperature compensation and leveling features. The principal components of the system are the liquid spring struts 1802. The struts 1802 can be located at the center of the rear of the cab 1806. A hydraulic linear actuator unit 1810 provides cab leveling and temperature compensation. A controller 1808 processes information from sensor input and create an output control signal for the hydraulic linear actuator unit. This approach incorporates a hydraulic linear actuator unit to accomplish the functions of the hydraulic power supply, fill and dump valves of the first configurations.

Figure 20:
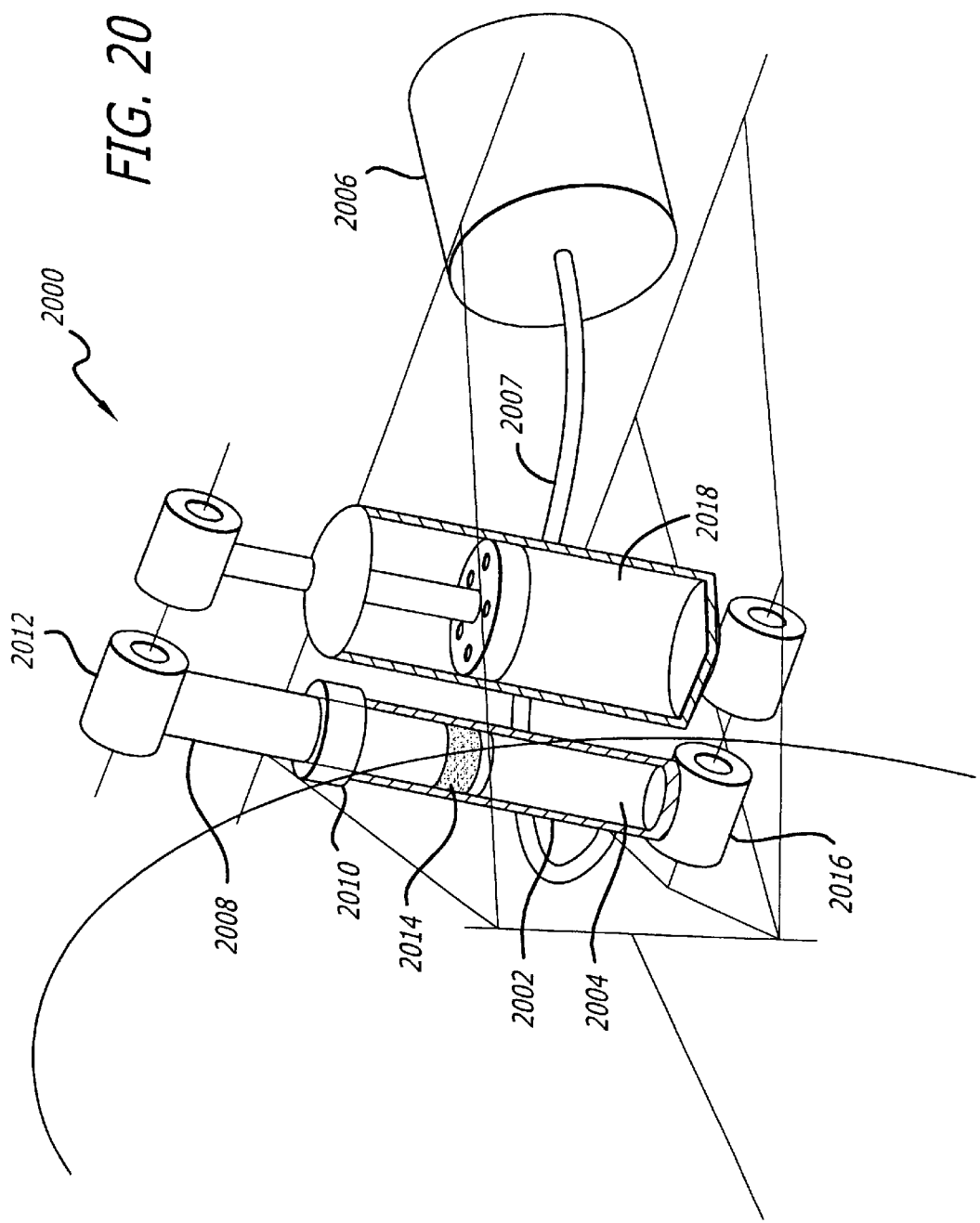
FIGS. 20 and 21 illustrate a pistonless liquid spring for use in vibration control.
Figure 21:
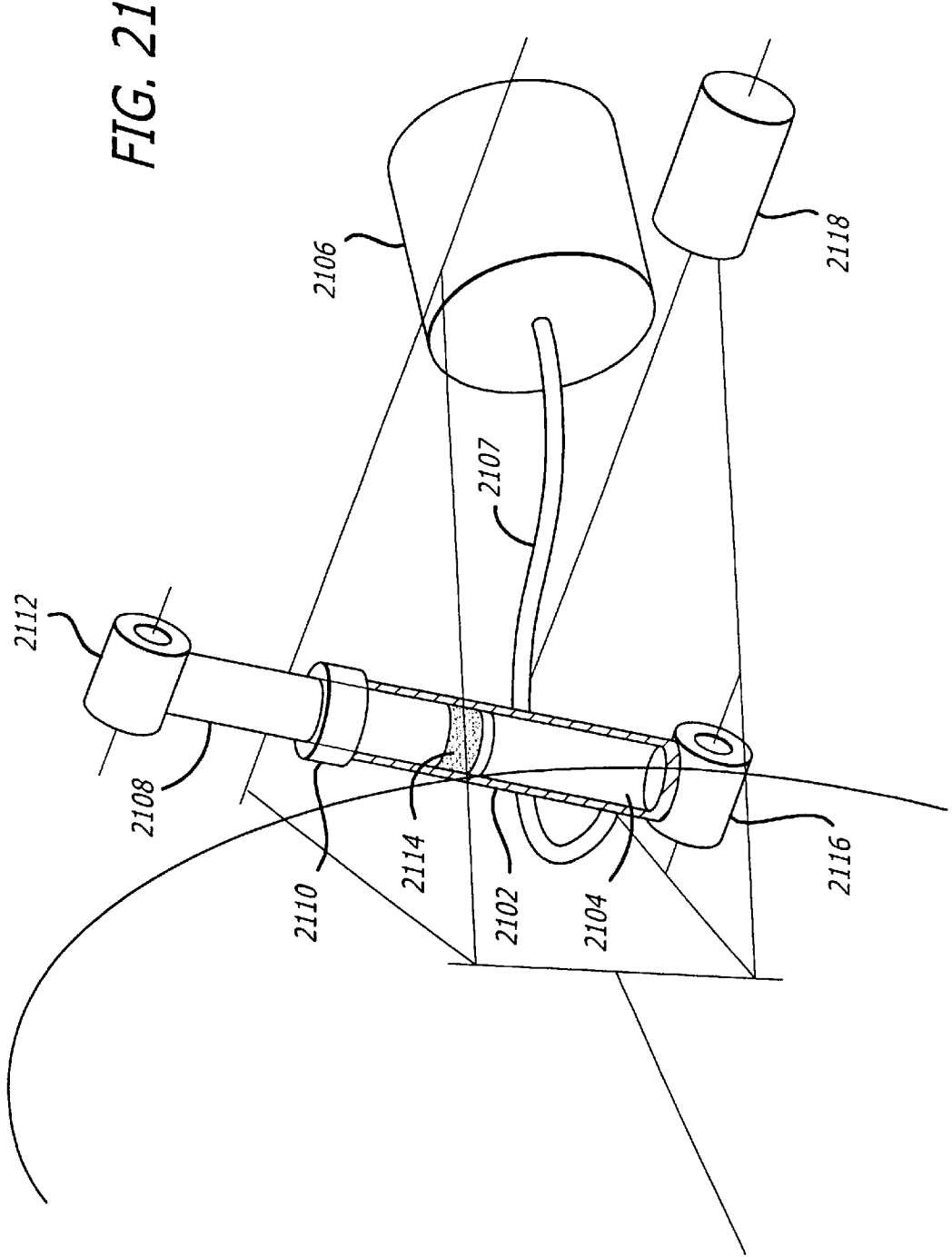

FIGS. 20 and 21 illustrate a pistonless liquid spring for use in vibration control. The pistonless liquid spring has an outer housing 2002, which is generally cylindrical. A first volume of compressible fluid 2004 is captured in this housing by a ram 2008. A supplemental volume 2006 is connected to the first volume by line 2007. A seal 2014 around the bottom of the ram prevents migration of the fluid 2004 around the ram. Likewise, a seal 2008 is placed around the top of the housing 2002. The ram can be attached to either the vibration source or the isolated load by connection means 2012. lhe housing can be attached to the other of the vibration source or the isolated load by connection means 2016.

The strut 2000 functions in every way like the liquid spring described above, with the exception that there is no damping element. Accordingly, damping must be obtained from a separate, conventional or adaptive shock absorber 2018. Alternatively, FIG. 21 illustrates a similar pistonless liquid spring; however, it is coupled to a torsional damper 2118. Again, the passive system acts as a spring but not as a damper.

Although preferred embodiments of the present invention have been described in the foregoing Detailed Description and illustrated in the accompanying drawings, it will be understood that the invention is not limited to the embodiments disclosed, but is capable oif numerous rearrangements, modifications, and substitutions of parts and elements without departing from the spirit of the invention. For exmple, the present invention may be designed for use with any number of separate external volumes, thereby allowing for more than two different spring rates to be applied to the liquid spring. Accordingly, the present invention is intended to encompass such rearrangements, modifications, and substitutions of parts.

We claim:

1. A suspension system for use on a vehicle having a frame and a wheel structure, said suspension system comprising:
   a liquid spring operably interposed between the frame and the wheel structure and using a set quantity of compressible liquid able to interact to generate both spring and damping forces in the suspension system in response to relative displacement between the frame and the wheel structure, the liquid spring including a housing having a first chamber in which a first volume of the compressible liquid is disposed, a piston reciprocally disposed within the chamber and dividing it into bounce and rebound subchambers, and at least one bypass passage relative to the piston able to place the bounce and rebound subchambers in fluid communication with one another for flow of the compressible liquid therebetween;
   a second volume of the compressible liquid in a second chamber located outside of the first chamber, the second volume removably connected to the first volume by a fluid passage; and
   a valve coupled to the fluid passage, the valve selectively operable to place the second volume in communication with the first volume to vary at least spring rate duinng relative displacement between the frame and the wheel structure.

2. A suspension system according to claim 1 wherein the second chamber is located remotely from the first chamber.

3. A suspension system according to claim 1 wherein the second chamber is separately supported on the frame from the liquid spring.

4. A suspension system according to claim 1 wherein the second volume is connected directly to the first volume via a port to at least one of the subchambers.

5. A suspension system according to claim 4 wherein the second volume is connected to the first volume at the bounce subchamber.

6. A suspension system according to claim 1 wherein the second volume is connected to the first volume through a passage in a rod connected to the piston and extending out of the first chamber.

7. A suspension system according to claim 1 also including a third volume6of the compressible liquid, different from the second volume, in a third chamber located outside of the first chamber, the third volume removably connected to the first volume by a second fluid passage; and a second valve coupled to the second fluid passage, the second valve selectively operable to place the third volume in communication with the first volume.

8. A suspension system according to claim 7 wherein the third chamber is located remotely from the first chamber.

9. A suspension system according to claim 7 wherein the third chamber is separately supported on the frame from the liquid spring.

10. A suspension system according to claim 1 also including at least one additional wheel structure and using the compressible liquid to generate both spring and damping forces in the suspension system in response to relative displacement between the frame and the additional wheel structure, the at least one additional liquid spring including a housing having a chamber in which a first volume of the compressible liquid is disposed, a piston reciprocally disposed within the chamber and dividing it into bounce and rebound subchambers, and at least one bypass passage relative to the piston able to place the bounce and rebound subchambers in fluid communication with one another for restricted flow of the compressible liquid therebetween; the second volume removably connected to the first volume of the at least one additional liquid spring by an additional fluid passage; and an additional valve coupled to the additional fluid passage, the additional valve selectively operable to place the second volume in communication with the first volume of the at least one additional liquid spring.

11. A suspension system according to claim 10 wherein there are three additional liquid springs operably interposed between the frame and three additional wheel structures.

12. A suspension system according to claim 1 also including a position sensor to measure the relative displacement between the frame and the wheel structure.

13. A suspension system according to claim 12 wherein the position sensor is internal within the liquid spring.

14. A suspension system according to claim 13 wherein the position sensor comprises a first rod connected to the piston, reciprocal with the piston and extending out of the first chamber, the first rod having a hollow interior; and a second rod fixedly attached to the liquid spring and positioned to be telescopically received with the hollow interior of the first rod.

15. A suspension system according to claim 1 wherein the bounce subchamber is positioned above the rebound subchamber.

16. A suspension system for use on a vehicle having a frame and a wheel structure, said suspension system comprising:

a liquid spring operably interposed between the frame and the wheel structure and using a set quantity of compressible liquid able to interact to generate both spring and damping forces in the suspension system in response to relative displacement between the frame and the wheel structure, the liquid spring including a housing having a first chamber in which a first volume of the compressible liquid is disposed, a piston reciprocally disposed within the chamber and dividing it into bounce and rebound subchambers, and at least one bypass passage relative to the piston able to place the bounce and rebound subchambers in fluid communication with one another for flow of the compressible liquid therebetween;

a second volume of the compressible liquid in a second chamber, the second volume removably connected to the first volume by a fluid passage that communicates directly to the first volume via a port to at least one of the subchambers; and a valve coupled to the fluid passage, the valve selectively operable to place the second volume in communication with the first volume to vary at least spring rate during relative displacement between the frame and the wheel structure.

17. A suspension-system according to claim 16 wherein the second volume is connected to the first volume at the bounce subchamber.

18. A suspension system according to claim 16 wherein the second chamber is located outside of the first subchamber.

19. A suspension system according to claim 18 wherein the second chamber is located remotely from the first chamber.

20. A suspension system according to claim 18 wherein the second chamber is separately supported on the frame from the liquid spring.

* * * * *